US006826280B1

(12) United States Patent
Sajadi et al.

(10) Patent No.: US 6,826,280 B1
(45) Date of Patent: Nov. 30, 2004

(54) SYSTEMS AND METHODS FOR MANAGING DIGITAL SUBSCRIBER LINE (DSL) TELECOMMUNICATIONS CONNECTIONS

(75) Inventors: Ahmad R. Sajadi, Eagan, MN (US); Robert M. Cain, Jr., Edina, MN (US); Robert J. Koziy, Burnsville, MN (US); Todd A. Morgenstern, Savage, MN (US); Steven M. Swam, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/460,633

(22) Filed: Dec. 14, 1999

(51) Int. Cl.[7] .............................. H04M 1/00; H04M 9/00
(52) U.S. Cl. .............................. 379/413.04; 379/413.02; 379/1.04
(58) Field of Search ................... 379/413.02, 399.01, 379/413.03, 413.04, 26.01, 1.01, 22.06

(56) References Cited

U.S. PATENT DOCUMENTS

| | | | |
|---|---|---|---|
| 4,538,868 A | | 9/1985 | Cruise et al. |
| 4,729,064 A | * | 3/1988 | Singer, Jr. .................... 439/716 |
| 4,829,564 A | * | 5/1989 | Jarvis .......................... 379/327 |
| 4,975,072 A | * | 12/1990 | Afshar ......................... 439/131 |
| 5,816,854 A | * | 10/1998 | Baggett et al. .......... 439/540.1 |
| 6,438,226 B1 | * | 8/2002 | Guenther et al. ...... 379/413.04 |

FOREIGN PATENT DOCUMENTS

| | | |
|---|---|---|
| EP | 0 317 852 A2 | 5/1989 |
| EP | 0 814 620 A2 | 12/1997 |
| EP | 0 891 067 A2 | 1/1999 |
| EP | 0 909 102 A2 | 4/1999 |

OTHER PUBLICATIONS

Exhibit A ADC Telecommunications catalog entitled "Fiber Cable Management Products, Second Edition," dated 10/95.
Exhibit B ADC Telecommunications catalog entitled "Fiber Panel Products, Second Edition," dated 7/96.
Exhibit C ADC Telecommunications catalog entitled "DSX-1 Digital Signal Cross-Connect, Fourth Edition," dated 1/92.
Exhibit D ADC Telecommunications catalog entitled "DSX-1 Digital Signal Cross-Connect Modules, Panels and Accessories, Sixth Edition," dated 5/98.
Exhibit E ADC Telecommunications catalog entitled "Digital Signal Cross-Connect (DSX-3) Front and Rear Cross-Connect Products," dated 2/99.

* cited by examiner

*Primary Examiner*—Rexford Barnie
(74) *Attorney, Agent, or Firm*—Merchant & Gould P.C.

(57) ABSTRACT

Telecommunications systems are provided which include telecommunications equipment, multi-pair connectors and cables, and management devices for grooming the conductors of the connectors and cables for efficient use of the conductor pairs between equipment. A further management device provides cross-connect fields for the conductor pairs of the system. A chassis may house the grooming device, any cross-connect device, and possibly a POTS splitter device. The grooming and cross-connects may be manually controlled, or electronically controlled, including locally or remotely.

9 Claims, 37 Drawing Sheets

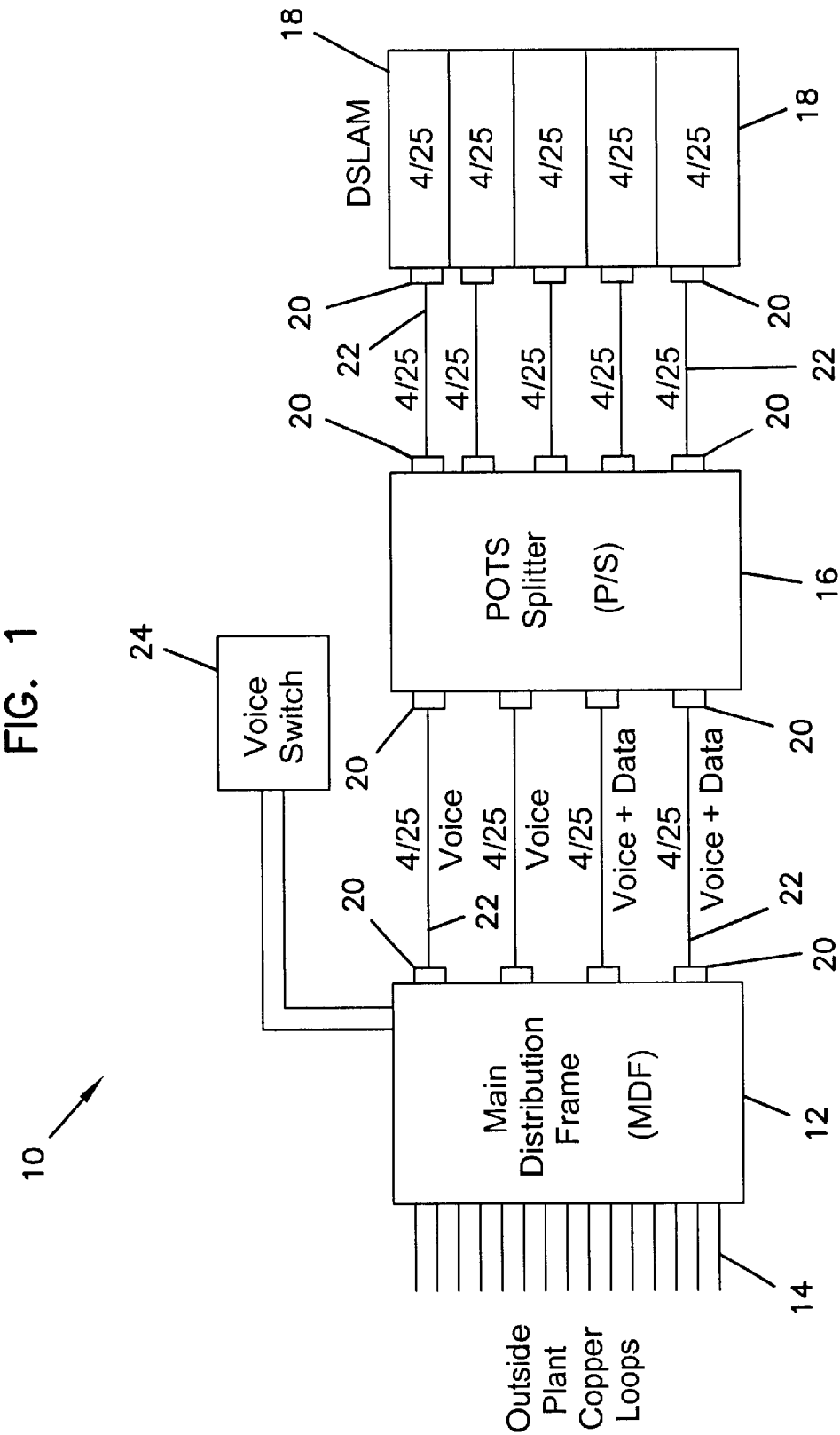

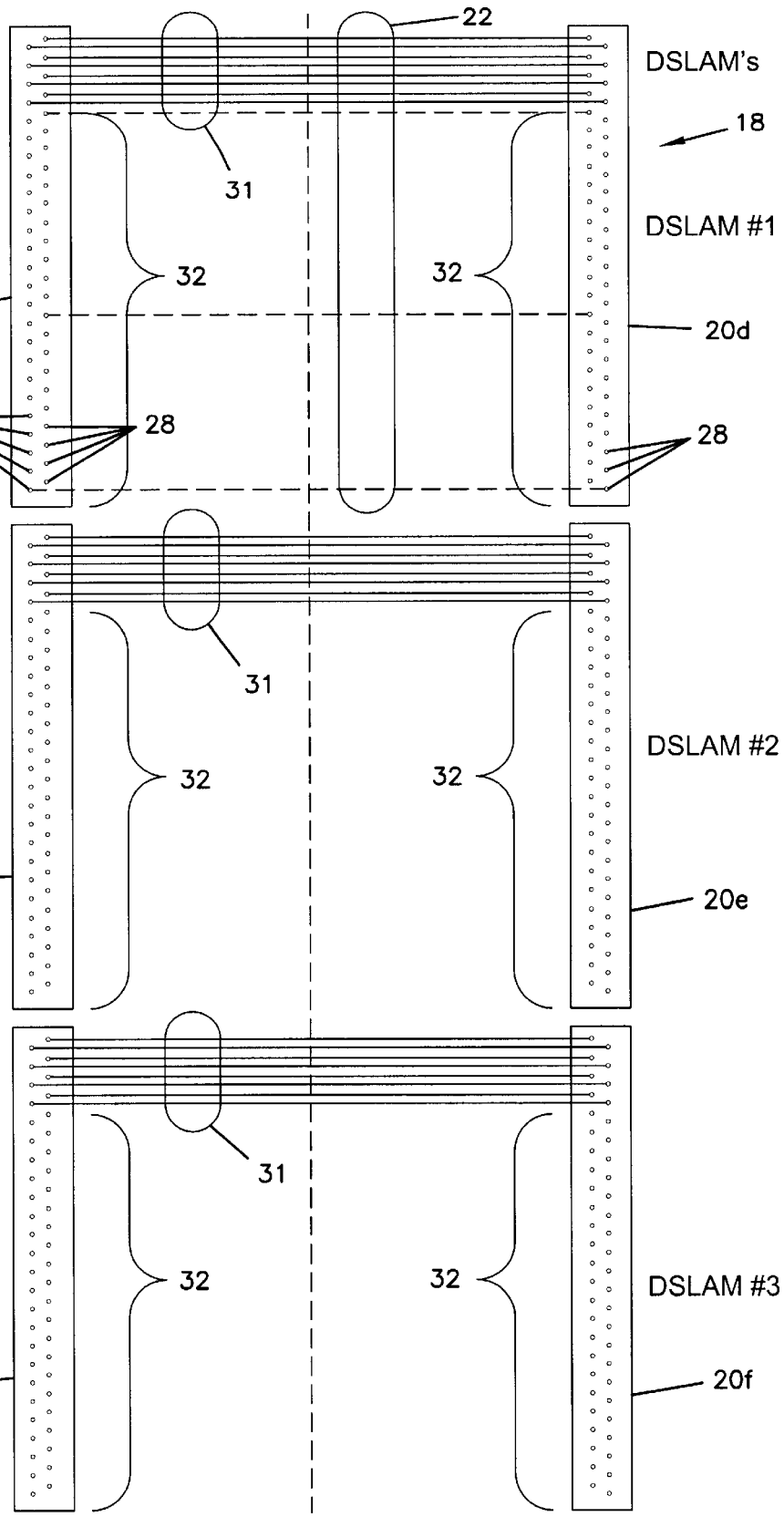

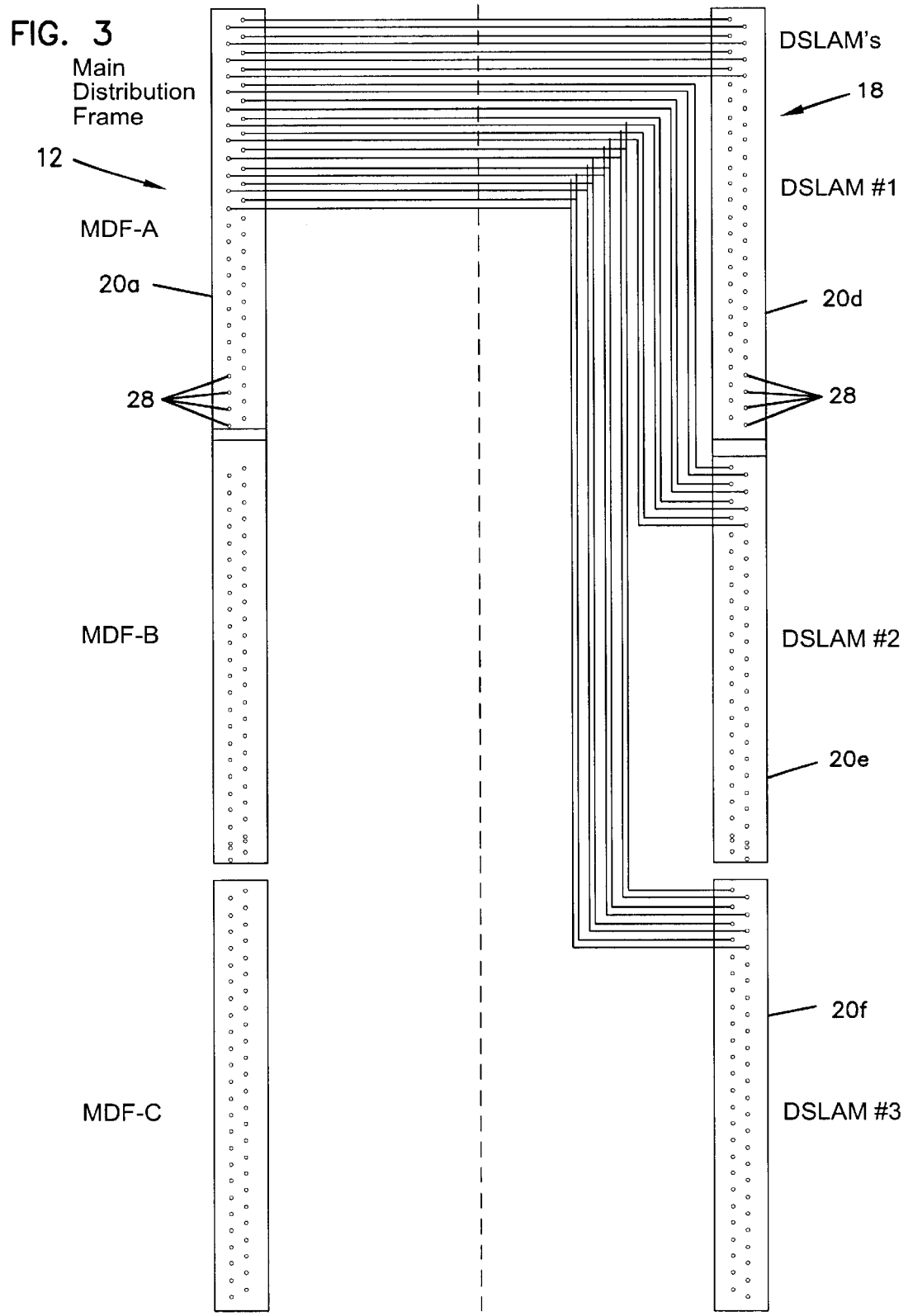

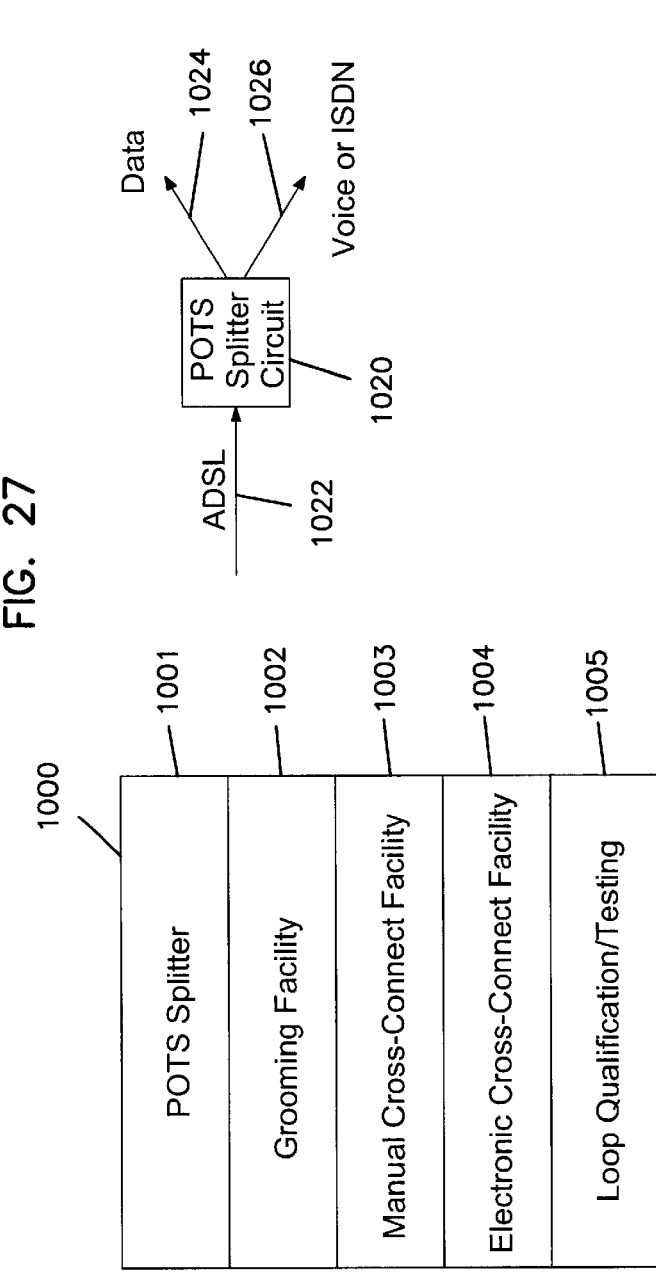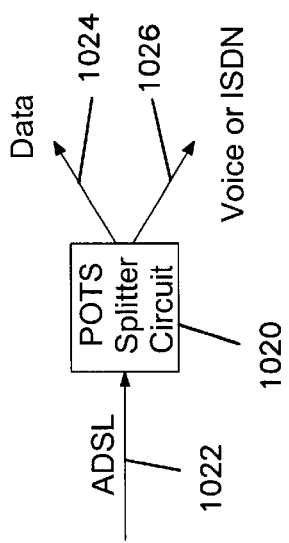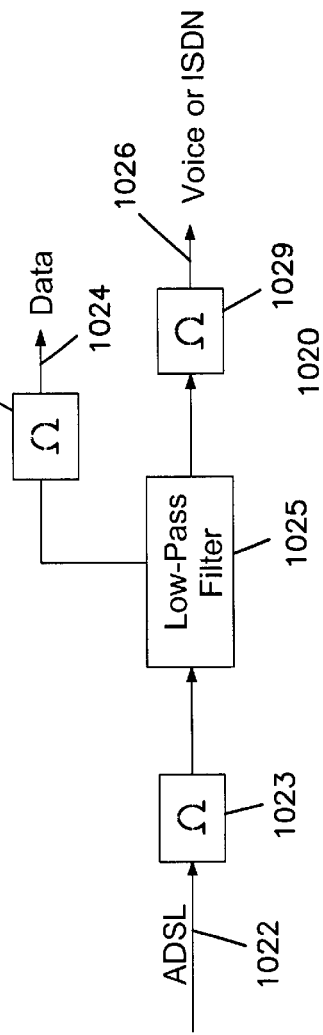

SYSTEMS AND METHODS FOR MANAGING DIGITAL SUBSCRIBER LINE (DSL) TELECOMMUNICATIONS CONNECTIONS

BACKGROUND OF THE INVENTION

Telecommunications systems are known which use cables containing bundles of twisted pairs of conductors for transmitting signals between locations for voice only signals, data only signals, and combined voice and data signals. In these systems, some of the telecommunications equipment for processing and transmitting the signals through the cables is configured for connection to cable connectors with multiple pairs of connectors, e.g. 25 pair Telco or Amp connectors. The connectors and cables provide links between the various pieces of telecommunications equipment in a twisted pair telephone system. In a telephone carrier system servicing residences and/or businesses, the system may include an MDF (Main Distribution Frame), a POTS (Plain Old Telephone Service) splitter for separating voice and data signals, and a DSLAM (Digital Subscriber Line Access Multiplexer). Such a system may employ a DSL (Digital Subscriber Line) communications protocol. Use of the connectors and cables is known where at least some of the conductor pairs are not used to carry signals. As systems grow in size, space constraints are a concern, such as for a telephone service carrier's MDF. A further concern includes the ease of access to the telecommunications equipment and connections for making changes and upgrades.

SUMMARY OF THE INVENTION

The present invention includes telecommunications equipment and systems for connection management. The equipment and systems are usable for DSL (Digital Subscriber Line) signals. One aspect of the invention relates to grooming of cables and connectors to utilize more conductor pairs of multi-pair connectors and cables, such as at an MDF (Main Distribution Frame).

A further aspect of the invention relates to providing cross-connect fields to permit changes and adaptability for the connector grooming device. A still further aspect relates to providing a POTS (Plain Old Telephone Service) splitter internal to a device containing a grooming device, and also optionally a cross-connect device. The equipment and systems are adapted for use with data signals, voice signals and combined voice and data signals, such as between an MDF, a POTS splitter and a DSLAM (Digital Subscriber Line Access Multiplexer). The cables and connectors can be groomed, and optionally cross-connected, as desired to suit the needs of the signal transmission system.

BRIEF DESCRIPTION OF THE DRAWINGS

FIG. 1 is a diagram of an example of a known telecommunications system including an MDF, a POTS splitter, and a plurality of DSLAMs, illustrating use of known connectors of the 25 pair type where only four pairs are utilized per connector;

FIG. 2 is a diagram showing active connections between an MDF and individual DSLAM cards, where only four pairs of the conductors for each connector are used for signal transmission, as used in known systems;

FIG. 3 is a diagram showing grooming of the conductor pairs for more efficient use of the MDF connectors in accordance with the present invention;

FIG. 24 is an illustration showing various components of a telecommunications system in accordance with an embodiment of the present invention;

FIG. 27 is an illustration of a POTS splitter and its outputs in response to receiving an ADSL signal at its input;

FIG. 28 is a block diagram of the POTS splitter of FIG. 27 shown in greater detail;

Figure 1B:
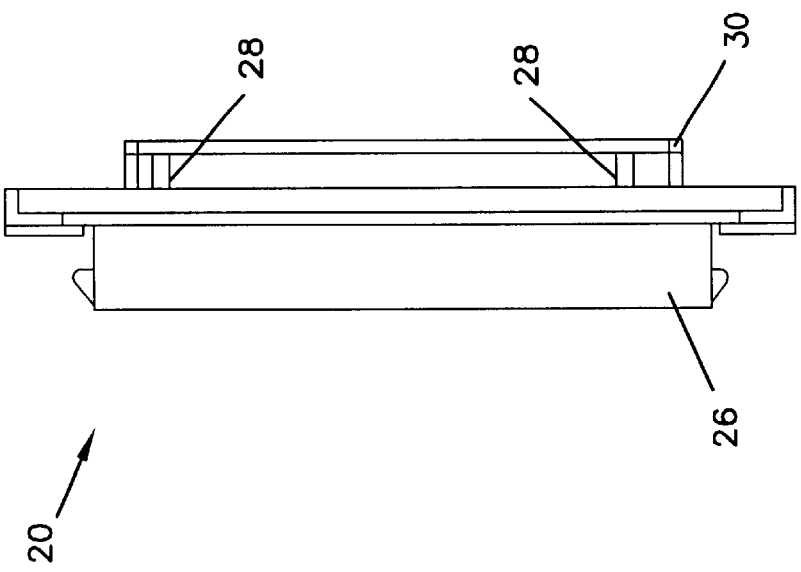
FIGS. 1A and 1B are front and side views of an exemplary 25 pair cable connector used in the system of FIG. 1.

While the invention is amenable to various modifications and alternative forms, specifics thereof have been shown by way of example in the drawings and will be described in detail hereinbelow. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF THE PREFERRED EMBODIMENTS

In the following description of illustrative embodiments, references are made to the accompanying drawings which form a part hereof, and in which is shown by way of illustration, various embodiments in which the invention may be practiced. It is to be understood that other embodiments may be utilized, and structural and functional changes may be made without departing from the scope of the present invention.

Referring now to FIG. 1, a telecommunications system 10 is shown including a known arrangement of equipment, cable or lines, and connectors for transmitting signals, such as in a twisted pair telephone system. System 10 is representative of a telephone carrier's system for transmitting voice and data to residences and businesses. A main distribution frame (MDF) 12 is linked to outside plant copper loops 14. MDF 12 has links to a POTS splitter device 16 and one or more DSLAM cards or modules 18. MDF 12, POTS splitter device 16, and DSLAMs 18 include connectors 20 having pairs of conductors for connecting to pairs of conductors of a reciprocal connector on an end of a cable 22. An example of connectors 20 shown in FIG. 1 are 25 pair connectors, such as Telco or AMP connectors, for use with a 25 pair cable 22 (containing 50 wire conductors). In use of system 10, POTS splitter device 16 receives voice and data signals from MDF 12, and passes the data signals through to DSLAM 18. The voice signals are passed from POTS splitter device 16 to MDF 12 for transmission to a voice switch 24.

Figure 1A:
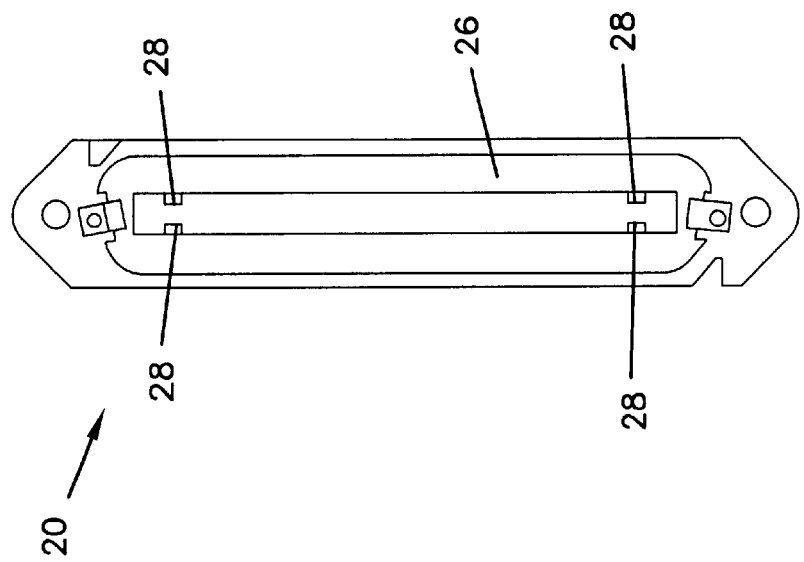

FIGS. 1A and 1B show one 25 pair connector 20 known in the art. End 26 connects each conductor pair 28 to a conductor pair of a mating connector mounted to the end of the multi-pair cable 22. End 30 provides the conductor pairs 28 on an opposite side of the connector 20 for connection to conductor pairs of cables, wires, or equipment.

For system 10 shown in FIG. 1 including connectors 20, and cables or lines 22, especially between MDF 12 and POTS splitter device 16, it is known to have a majority of the pairs of conductors in the connectors 20 and the corresponding wires in cables 22 unused. As shown in FIG. 1, only 4 of the 25 pairs of conductors are used. Other conventional systems which do not require POTS splitter device 16 also experience inefficient use of cables and connectors between MDF 12 and DSLAMs 18. FIG. 2 illustrates the use of 25 pair connectors 20a–f including 25 pairs of conductors 28. FIG. 2 further illustrates the used or active conductor pairs 31 and the unused or inactive conductor pairs 32 of the cables 22 between connectors 20a–c of MDF 12 and connectors 20 d–f of DSLAMs 18. The illustrated DSLAMs 18 are the type with 4 signal pairs per card or module. Other DSLAM types are useable including 8/25 or 12/25 or greater. Such a system allows for usage of known cable types and connector types including the exemplary 25 pair connector 20 shown in FIGS. 1A and 1B. Further, as improvements or changes in system components are made over time (e.g. changing from 4/25 to 8/25 DSLAM cards), increases in the number of used pairs can be made without changing connector or cable types. However, the systems all have unused conductor pairs in the connectors. Increased utilization of the conductor pairs in the system of FIG. 1 is possible by grooming the conductor pairs to use more of the unused pairs. This greatly reduces the number of cables and connectors at MDF 12.

Referring now to FIG. 3, grooming is shown in greater detail where conductor pairs of multiple connectors 20d–f of DSLAMs 18 are combined into one connector 20a of MDF 12. This results in more conductor pairs 28 of connector 20a being used than in the ungroomed arrangement of FIG. 2. Less connectors 20 are needed for MDF 12 in FIG. 3 over FIG. 2.

Figure 4:
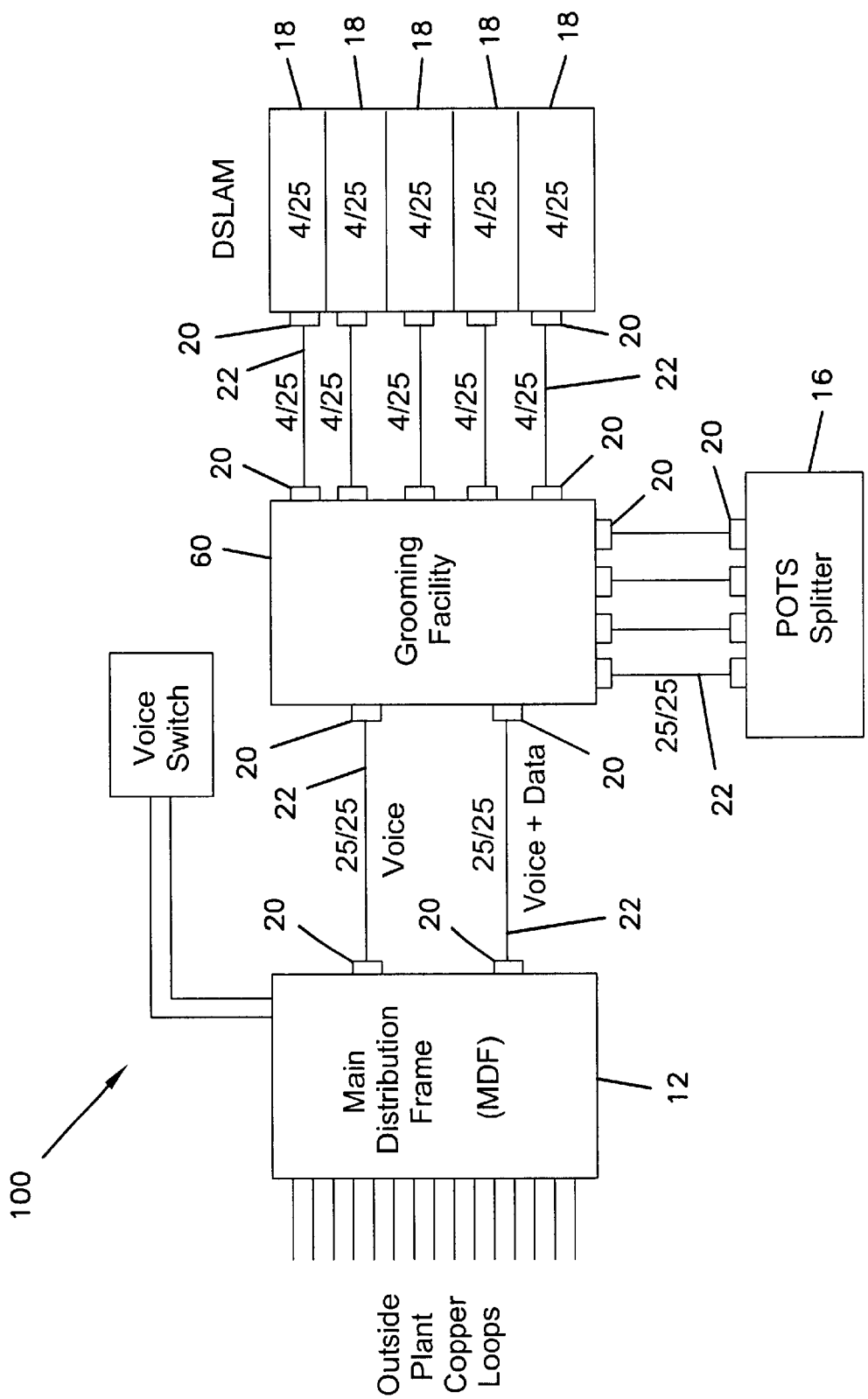
FIG. 4 is a diagram of a telecommunications system embodiment of the present invention including an MDF, a POTS splitter device, and several DSLAM modules, and further showing a grooming facility for grooming the conductor pairs for the DSLAM connections with the MDF.

Referring now to FIG. 4, a system 100 has a grooming facility 60 incorporating the grooming of FIG. 3 for grooming the lines 22 from DSLAMs 18 while allowing efficient use of connectors 20 on MDF 12 and POTS splitter device 16. FIG. 4 shows increased use of the conductor pairs to MDF 12 and to POTS splitter device 16 from grooming facility 60. Referring now to FIGS. 10–14, a first embodiment of equipment 200 is shown for performing the grooming functions at grooming facility 60 of FIG. 4. Equipment 200 includes a grooming field 202 for use in grooming cables, such as between DSLAMs like DSLAMs 18, and MDF 12. In a grooming only situation, a cross-connect panel 252 (described below) is not necessary. Grooming field 202 includes a panel 203 including a plurality of multi-pair connectors 204 mounted to panel 203. An exemplary connector type is shown in FIGS. 1A and 1B. A first array 206 of connectors 204 may have connections to DSLAMs 18 or POTS splitter device 16. A second array 208 of connectors 204 connects to MDF 12 and/or POTS splitter device 16. On a front side 210 of grooming panel 203 resides all of the cables and connectors to the equipment (MDF, POTS splitter device and DSLAMs). A back side 212 of grooming panel 203 would contain all necessary conductive links, such as conductive wires, cables, or other links, linking the various conductor pairs between connectors 204, so as to achieve grooming, as illustrated in FIG. 3, for the used contacts. For example, a plurality of connectors 204 from first array 206 will have the used contacts wired to a reduced number of connectors 204 of second array 208, thereby using more conductor pairs of each connector 204 in second array 208, as well as using more of the respective conductor pairs in the cable 22 connecting to the MDF, and to the POTS splitter. As a more specific example, several connectors 204 from first array 206 are connected to DSLAMs 18, and the reduced number of connectors 204 in second array 208 are connected to MDF 12.

Figure 5:
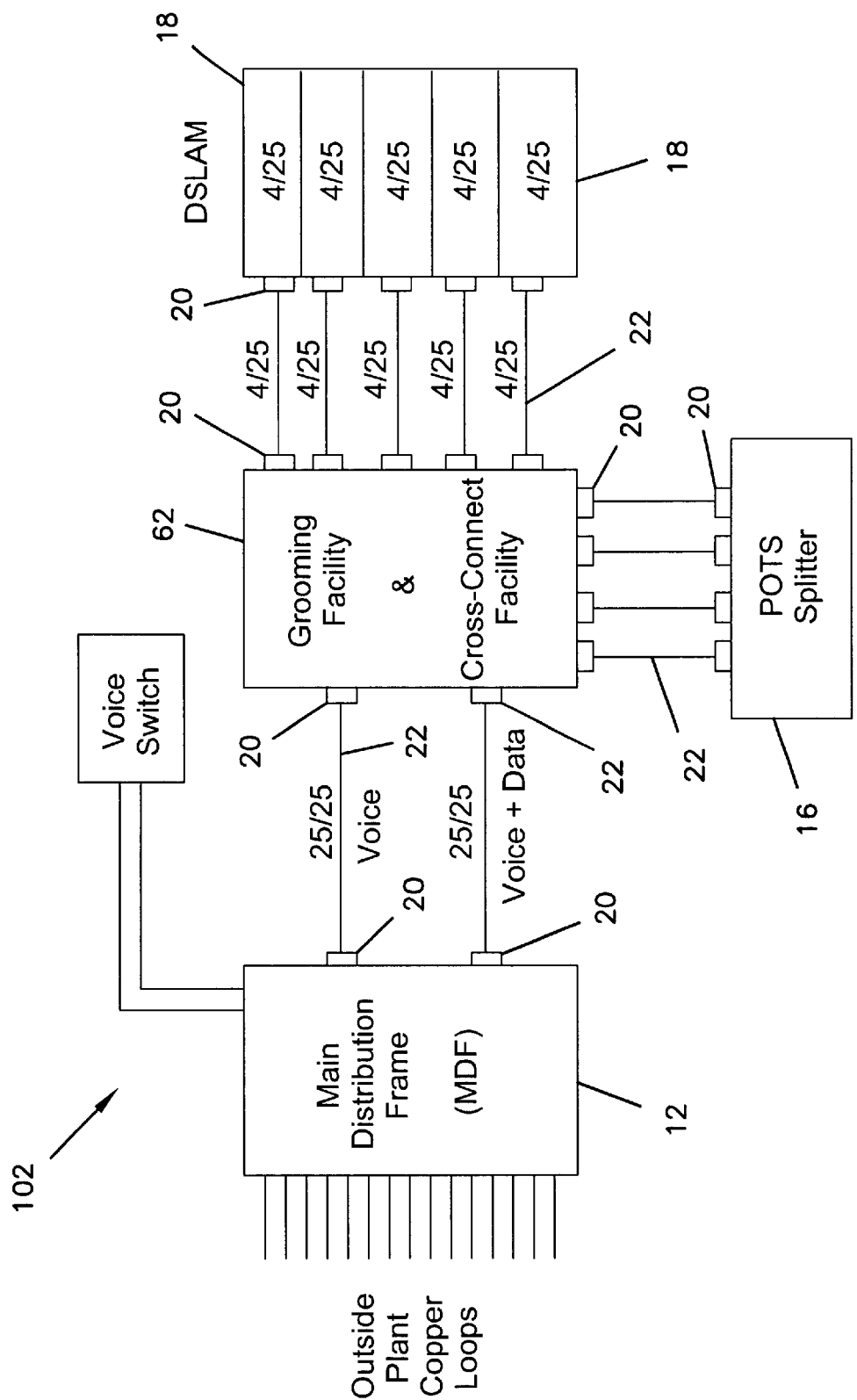
FIG. 5 is a diagram of a further telecommunications system embodiment of the present invention showing a combined grooming and cross-connect facility.

In the embodiment just described, the grooming connections between the arrays 206, 208 of connectors 204 would be on the back side 212 of grooming panel 202. These connections are housed within chassis 270 behind panel 203 and rear 272. If desired, a cross-connect field 250 can be added for adaptability and ease of changeability for the connections between the arrays of connectors. Adaptable and changeable grooming can occur at cross-connect field 250. In FIG. 5, a system 102 has a combined grooming and cross-connect facility 62 which more readily allows for changes and customization to the connections between the arrays of connectors. In the equipment 200 of FIGS. 10–14, cross-connect panel 252 includes a plurality of connectors 251, each including a front connector location 254 linked to a rear connector location 256. Conductive links, such as conductive wires, link the rear conductor pairs of each connector 204 to the conductor pairs defined by rear connector locations 256. In use of the cross-connect features, equipment 200 of FIGS. 10–14 preferably includes a one-to-one correspondence between the rear of connectors 204 at back side 212 to rear connector locations 256. Front connector locations 254 can be cross-connected to each other to complete, and groom, the circuit as desired with linking or patch conductors or cables. Field 250 defines arrays 260, 262 corresponding to arrays 206, 208 for connector panel 203.

For equipment 200, front and rear connector locations 254, 256 can be any desired connector type. Some examples include insulation displacement connectors (IDC), and wire wrap termination pins. One example connector is shown and described in U.S. Pat. No. 4,624,521, the disclosure of which is incorporated by reference. Also, connector jacks can be used, such as DS1 jacks including ports for receiving plugs of patch cables. Also, if jacks are used, monitor ports can also be provided, as desired.

Referring again to FIGS. 10–14, cross-connect panel 252 is preferably hinged relative to chassis 270 at hinge 268. This allows user access to the cable connections at connectors 204 at front side 210. Grooming panel 202 is positioned behind cross-connect panel 252, both of which are accessed at the same side (front) by a user. Alternatively, cross-connect panel 252 can be positioned adjacent to rear 272 of chassis 270, facing in the opposite direction. In equipment 200, access openings 274 in sides 276 allow for the cables from the other equipment to enter chassis 270 for connection to connectors 204 at front side 210. Since grooming panel 202 and cross-connect panel 252 face in the same direction in the illustrated embodiment, further openings 280 are provided in chassis 270 for the one-to-one contact conductors to link from rear 212 of grooming panel 202 to rear connector locations 256. If desired, cross-connect panel 252 and grooming panel 202 can be reversed such that cross-connect panel 252 is within chassis 270. Also, panels 252, 202 may be mounted in separate racks or chassis if desired. Cable management clips 282 are positioned on cross-connect panel 252 to assist with management of the patch cables.

Figure 6:
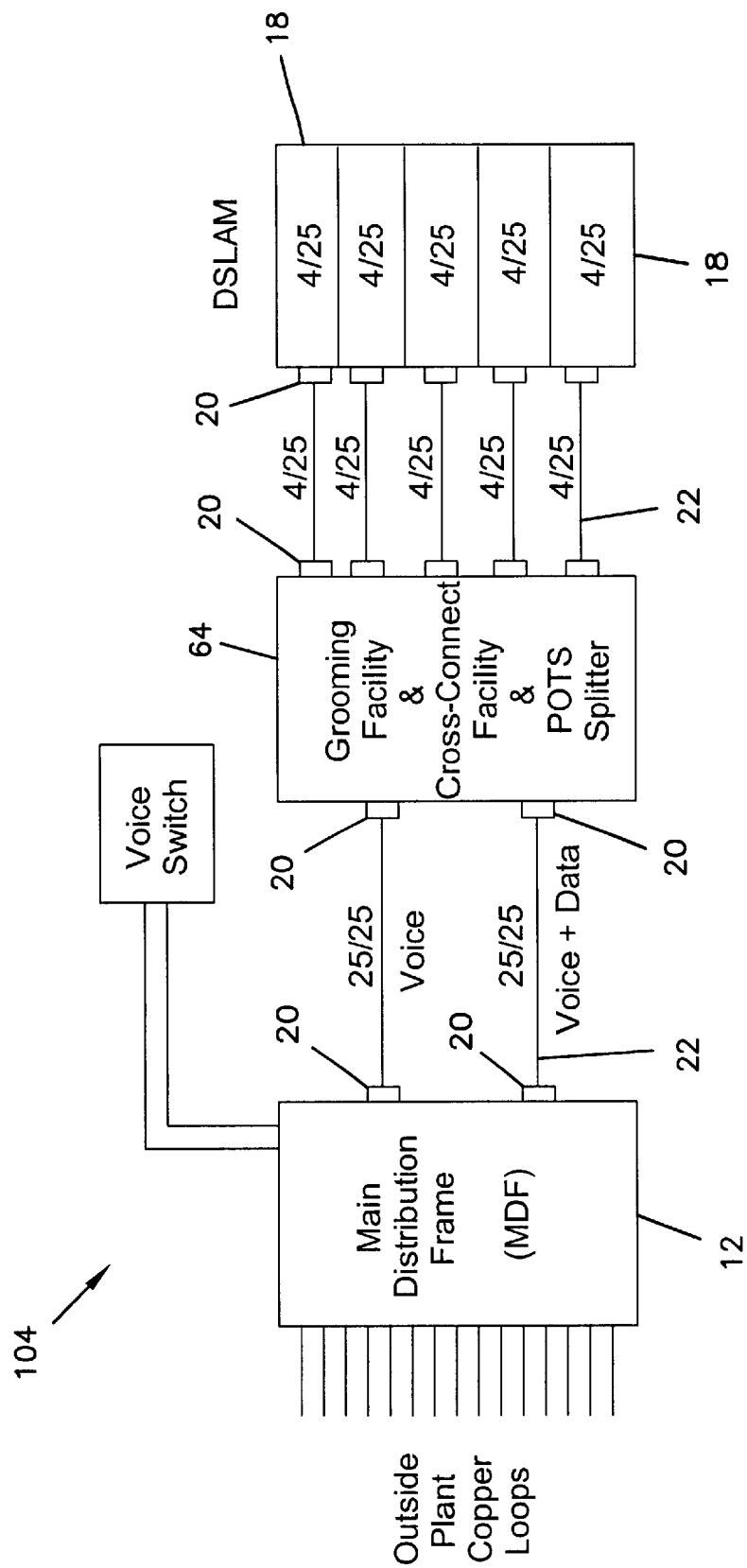
FIG. 6 is a diagram of a further telecommunications system embodiment of the present invention showing a POTS splitter device combined with the grooming and cross-connect facility.
Figure 7:
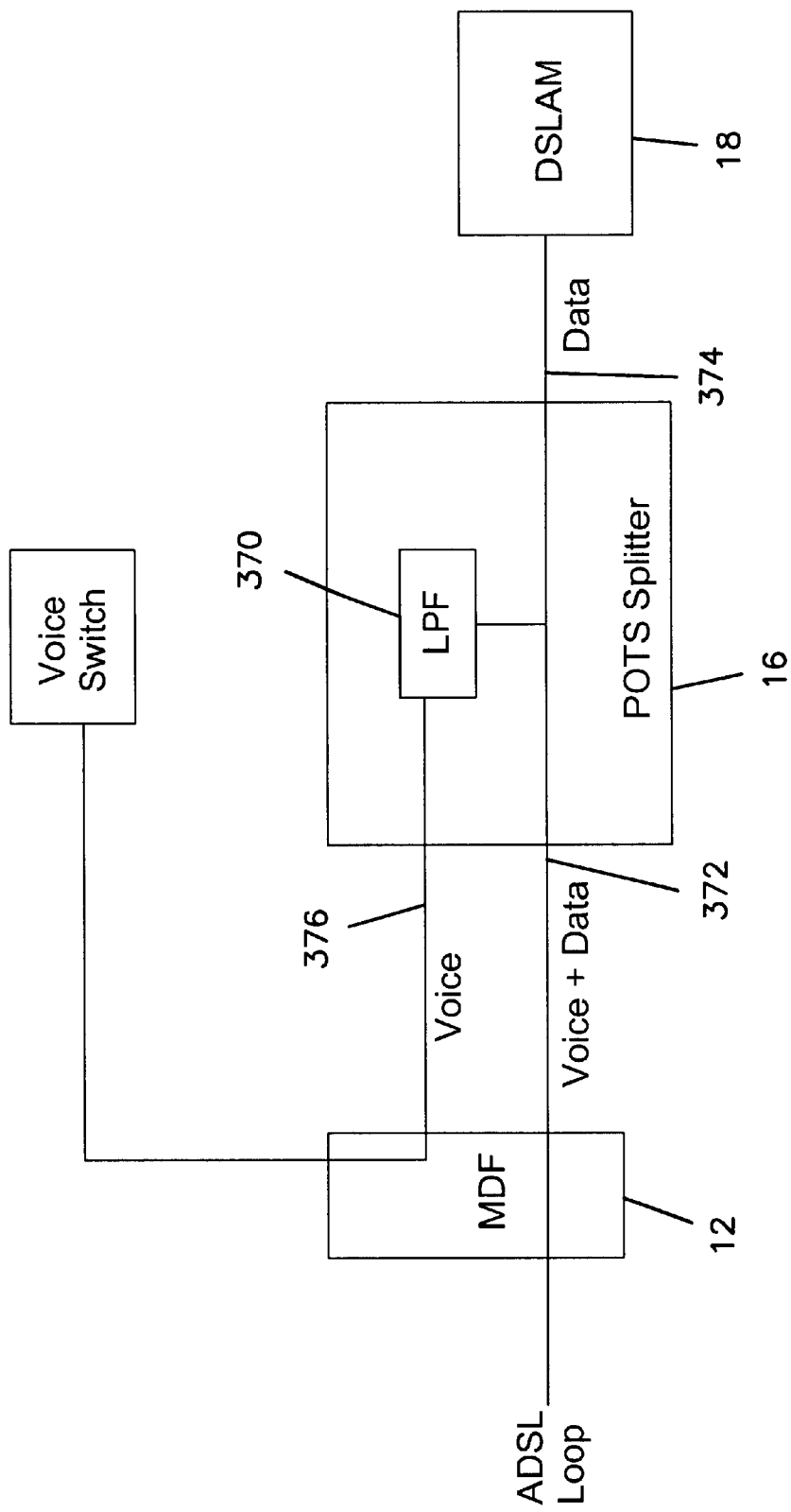
FIG. 7 is a diagram showing the signal paths in one implementation of a telecommunications system for transmitting an ADSL (Asymmetric Digital Subscriber Line) signal in the system including an MDF, a POTS splitter device, and a DSLAM.

Referring now to FIG. 6, a grooming function is combined with both a cross-connect function and a POTS splitter device for facility 64 in system 104. Facility 64 of FIG. 6 is an integrated system for the grooming and cross-connect functions noted above. Also, efficiencies result by further combining the POTS splitter function with grooming and cross-connect. Referring now to FIGS. 15–19, a further embodiment of telecommunications equipment 300 is shown for performing the functions of facility 64. Equipment 300 includes a grooming panel 302, a cross-connect panel 352, and a POTS splitter device 360 including a plurality of splitter cards 366. An exemplary POTS splitter signal path is shown in FIG. 7. A low pass filter 370 filters the voice signal from the voice and data line 372. Data line 374 transmits the data portion of the signal to DSLAM 18. The voice portion of the signal is returned to MDF 12 by voice line 376.

In equipment 300, the appropriate number of low pass filters 370 are housed in splitter cards 366. Panels 302, 352 are constructed to function in a similar manner to panels 203, 252 described above. Grooming panel 302 includes a first array 303 of connectors 304 and a second array 305 of connectors 306. Panel 302 includes a first section 308 for array 303 and a second section 309 for array 305. First section 308 is located on an exterior of chassis 378, and second section 309 is located within chassis 378. Connectors 306 connect to DSLAMs 18, such as with 25 pair connectors. First connectors 304 connect to MDF 12, and may be 25 pair or other connectors, such as 32 pair connectors. Cross-connect panel 352 includes connectors 351, each including a front connector location 354 and a rear connector location 356. From the rear of each of connectors 304, 306, conductors connect to rear connector locations 356 in a one-to-one manner to form cross-connect panel 352. The conductors from the rear of each connector 304 may connect to the low pass filters 370 for the POTS splitter function for voice and data signals before connecting to cross-connect panel 352. Front panel 352 is hinged to chassis 378 in a like manner as equipment 200 or is otherwise removable to access the interior of chassis 378 for connectors 306. Connectors 351 define a cross-connect field 350 with arrays 313 and 315 linked in a one-to-one manner with connectors 304, 306. In one example, connectors 304 are connected to MDF 12 on the fronts and the rears are connected to array 313 and splitter cards 366. In the same example, connectors 306 form DSLAM connectors 306 on the fronts and are connected on the rears to array 315. For voice only signals from splitter cards 366, there is a conductive link to an MDF connector 304 for transmission of the voice only signals back to MDF 12. For example, 4 connectors 304 of sub-array 303' are linked to backplane 380 and then to splitter cards 366, and from splitter cards 366 to backplane 380. For the data signals, connections are then made to cross-connect array 313 for cross-connection to array 315. For the voice signals, connections are instead made to the other four connectors 304 of sub-array 303" for transmission back to MDF 12. The connections to and from backplane 380 including circuit paths thereon can be by cable, such as ribbon cable. If desired, additional connectors 351 can be added for the conductive links to and from splitter cards 366, for additional flexibility of the system circuitry. With the additional connectors 351, the various components including the low pass filters can be cross connected together.

Figure 9:
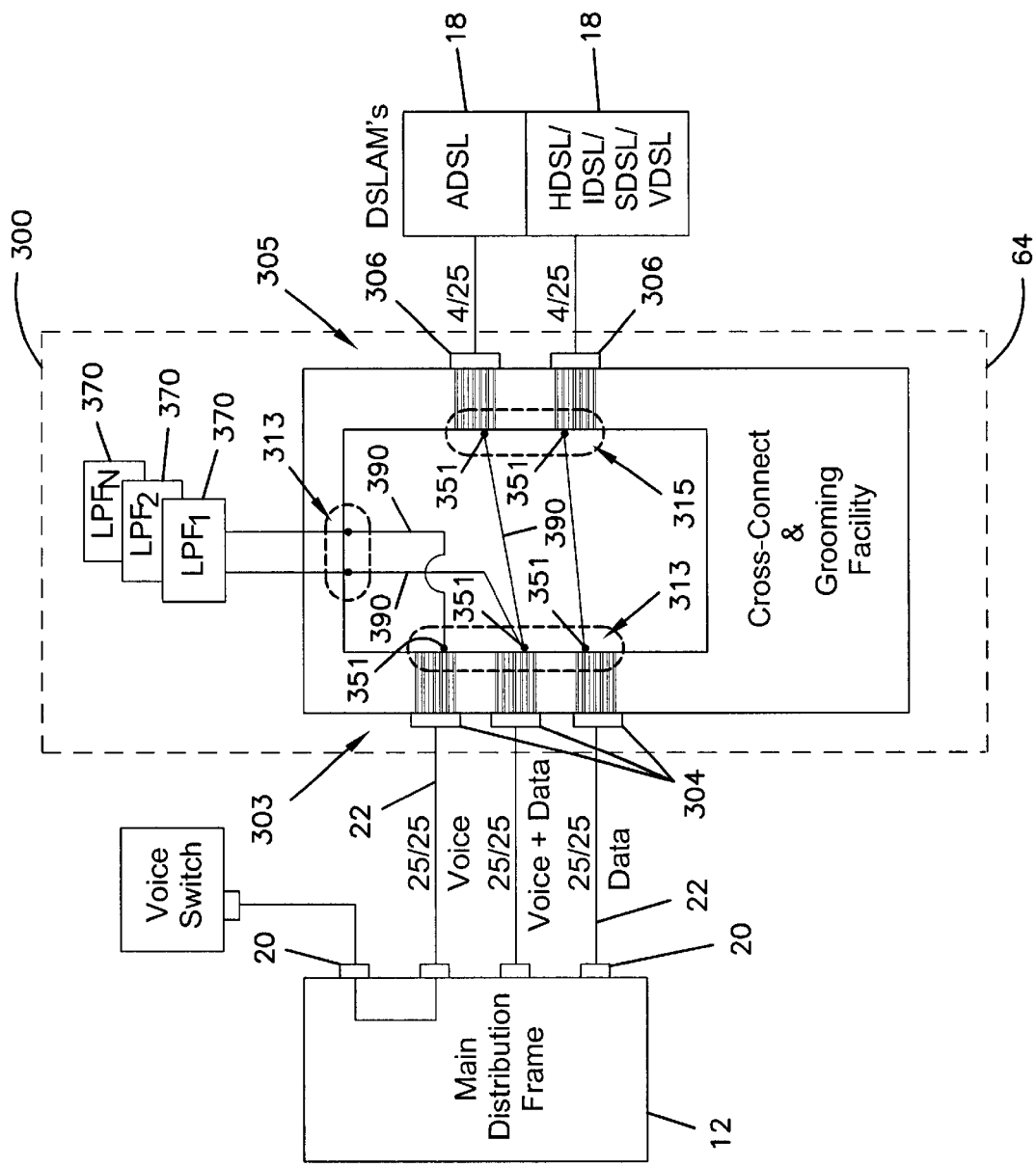
FIG. 9 shows the system of FIG. 6 in greater detail with different signal types transmitted through the system, and showing the cross-connections for different signal types.
Figure 10:
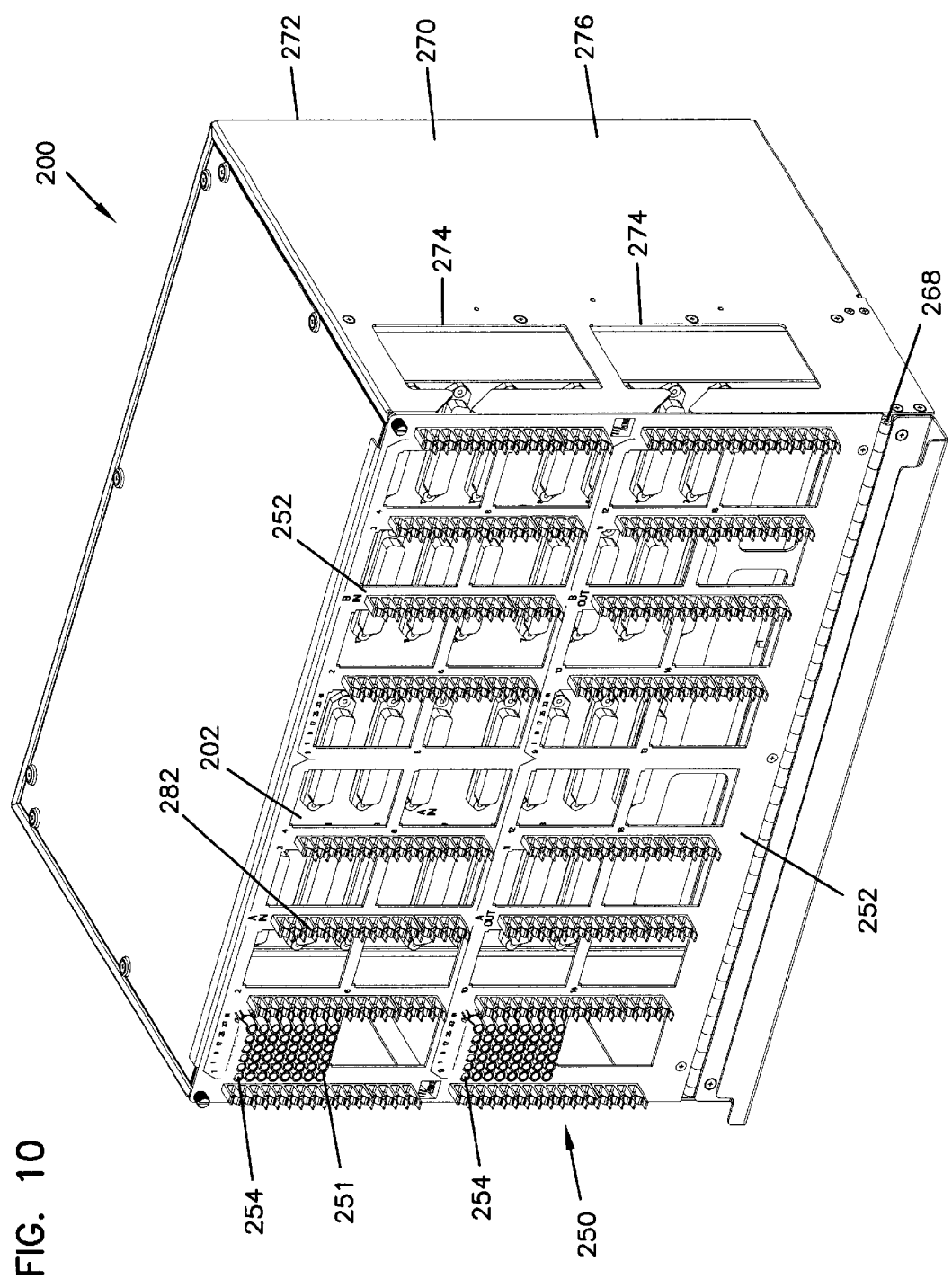
FIG. 10 is a perspective view of one embodiment of a telecommunications equipment including a grooming panel and a cross-connect panel.
Figure 11:
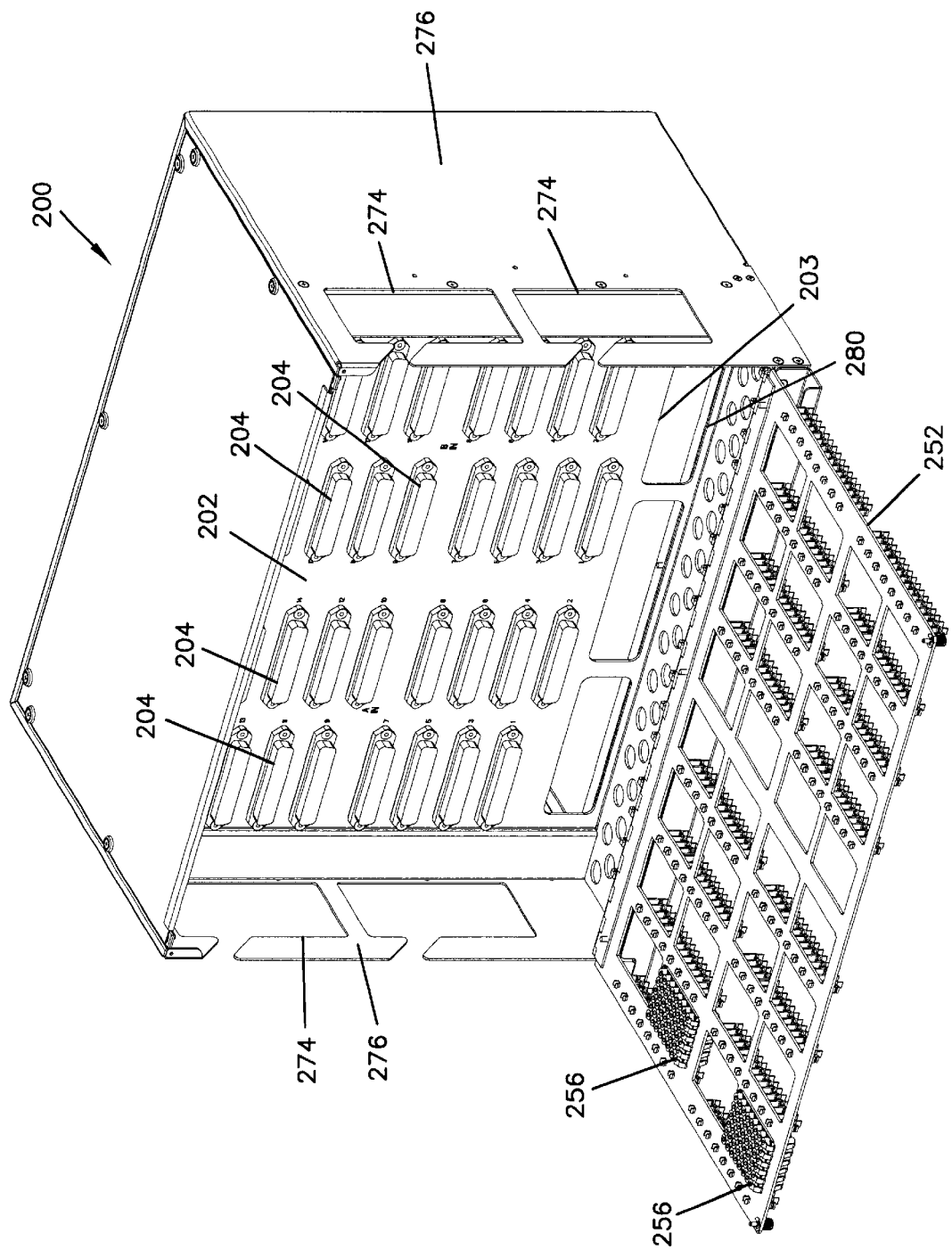
FIG. 11 shows the equipment of FIG. 10, with a front door pivoted open exposing the grooming panel.
Figure 12:
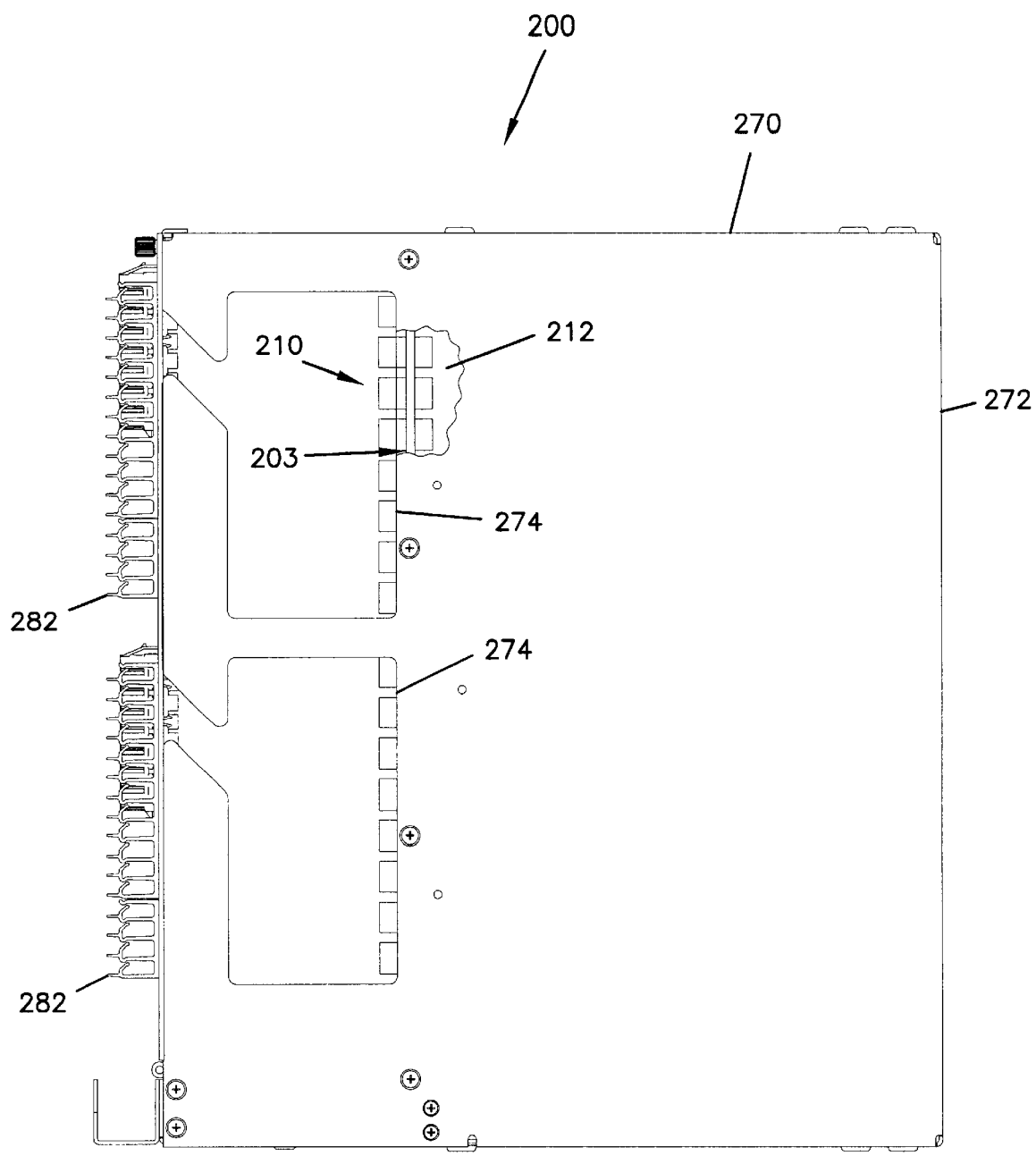
FIG. 12 is a side view of the equipment of FIG. 10.
Figure 13:
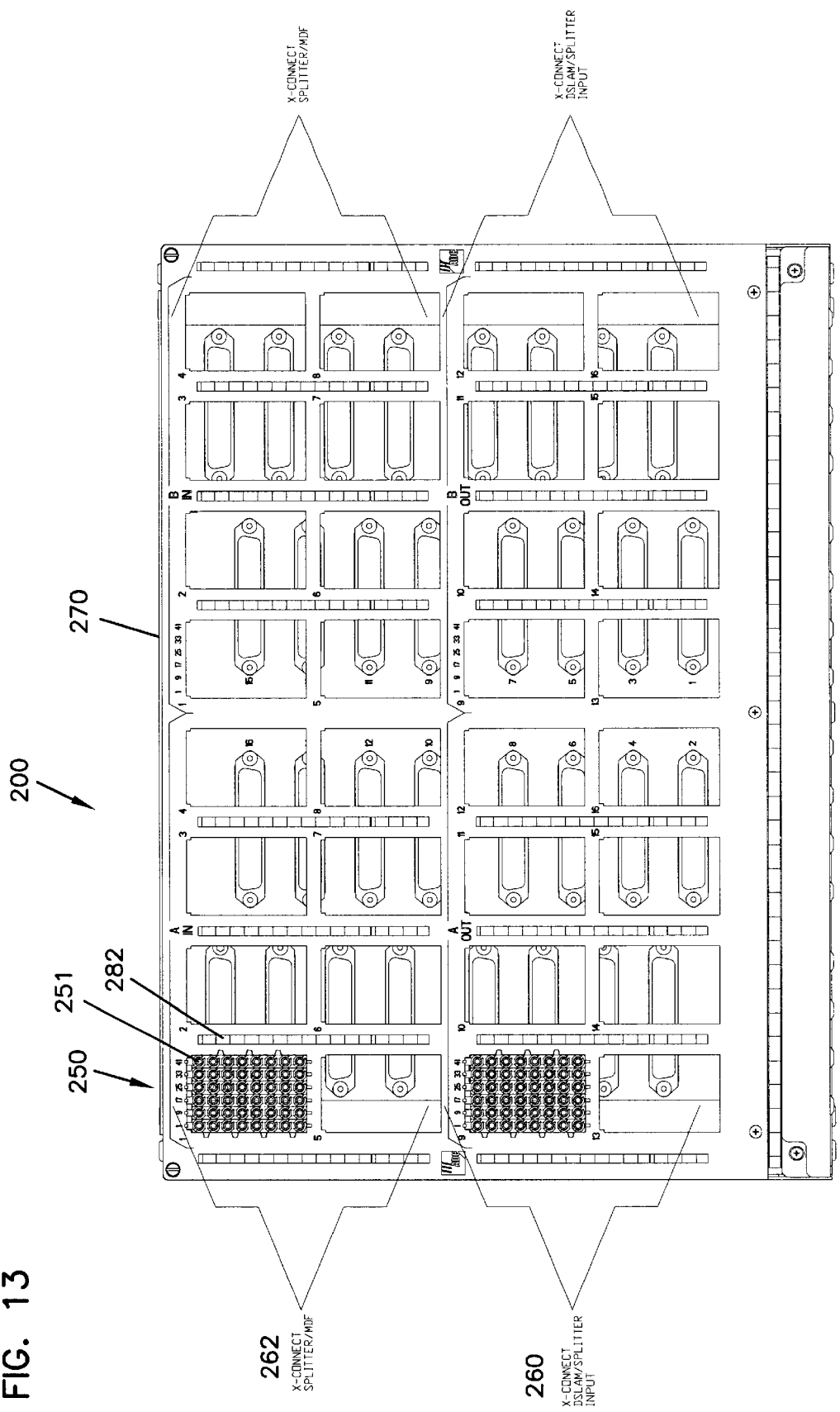
FIG. 13 is a front view of the equipment of FIG. 10.
Figure 14:
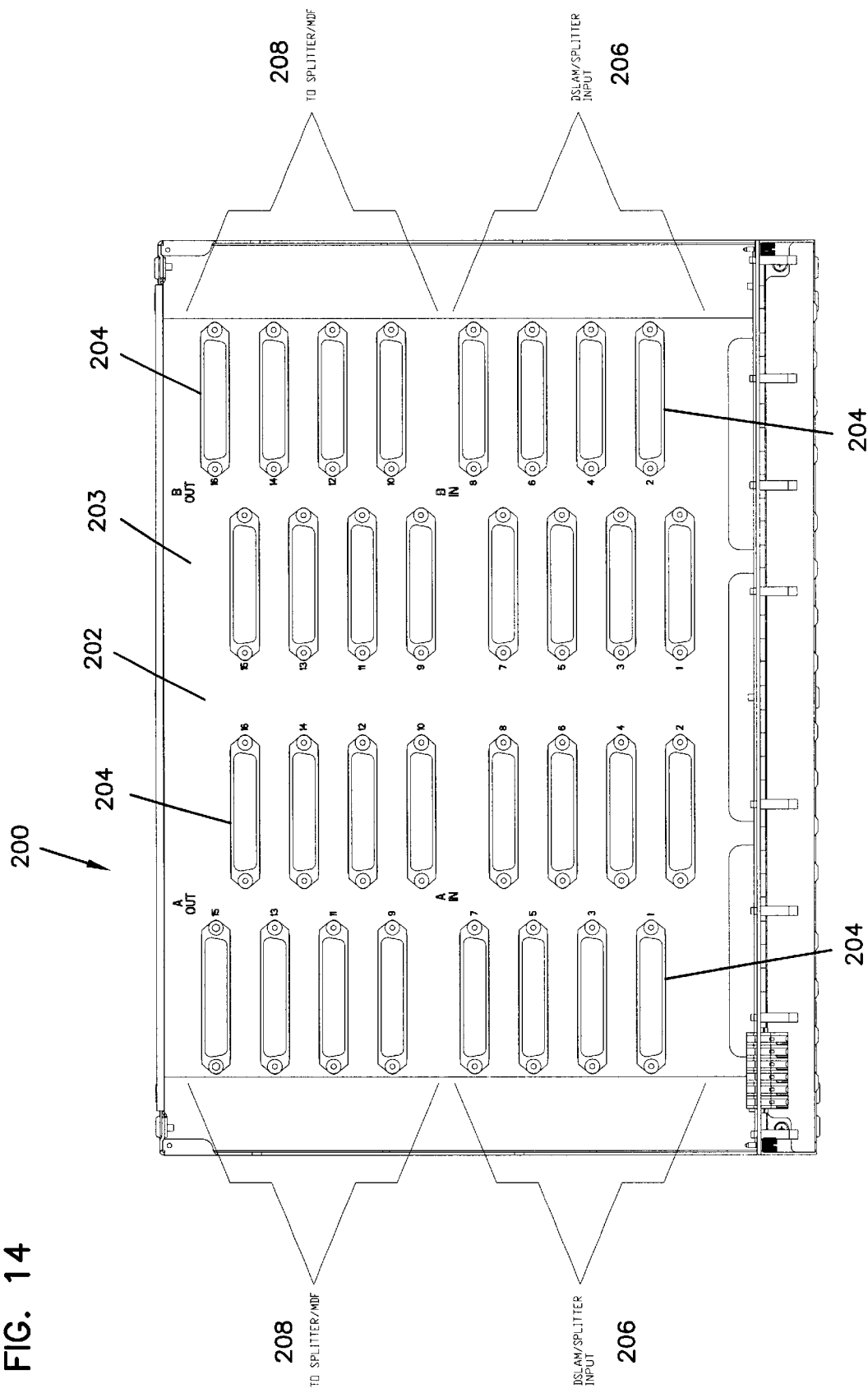
FIG. 14 is a front view of the equipment of FIG. 11.
Figure 15:
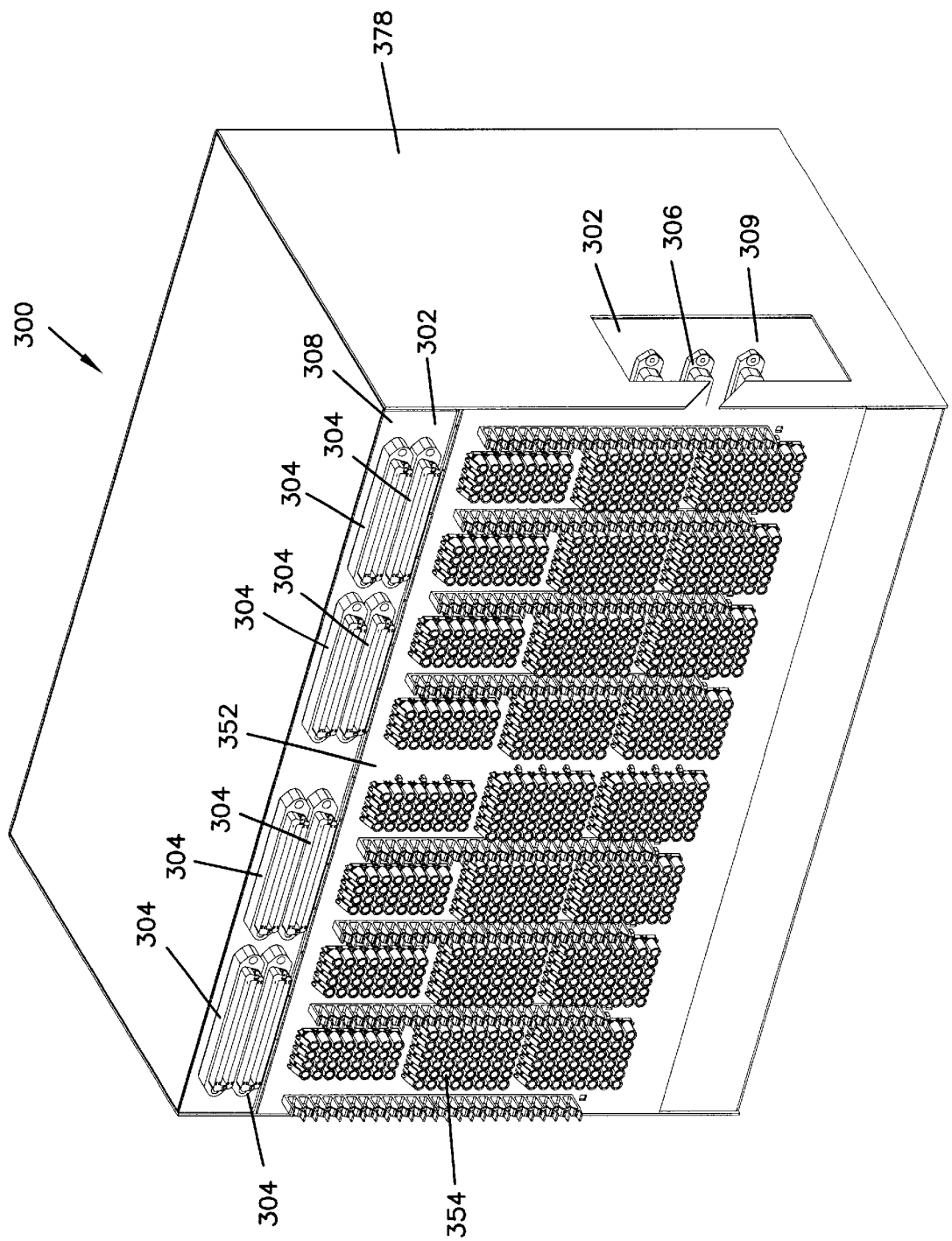
FIG. 15 is a perspective view of a further embodiment of a telecommunications equipment, including a grooming panel, a cross-connect panel, and POTS splitter devices internal to the chassis.
Figure 16:
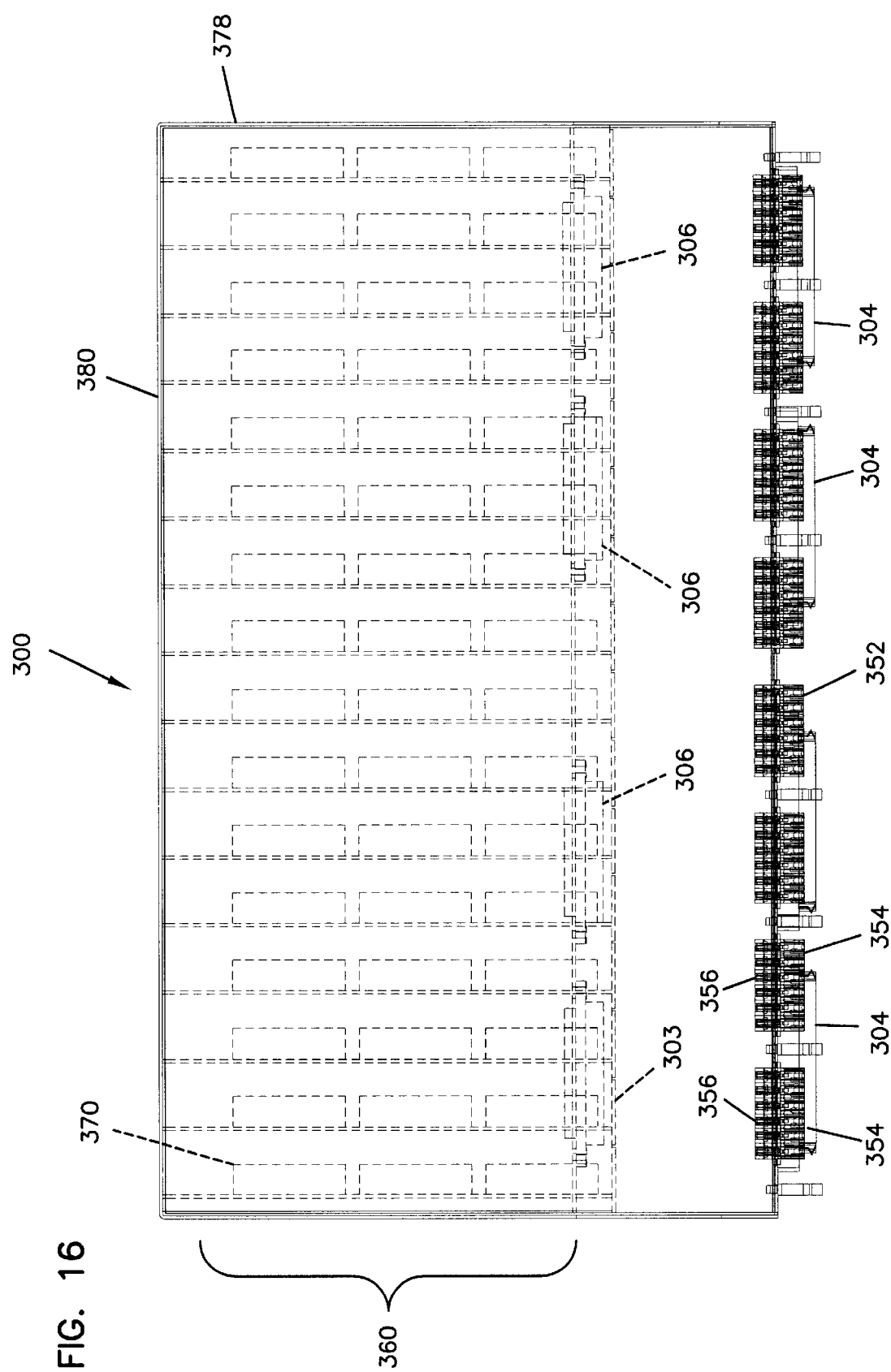
FIG. 16 is a top view of the equipment of FIG. 15, showing internal features.
Figure 17:
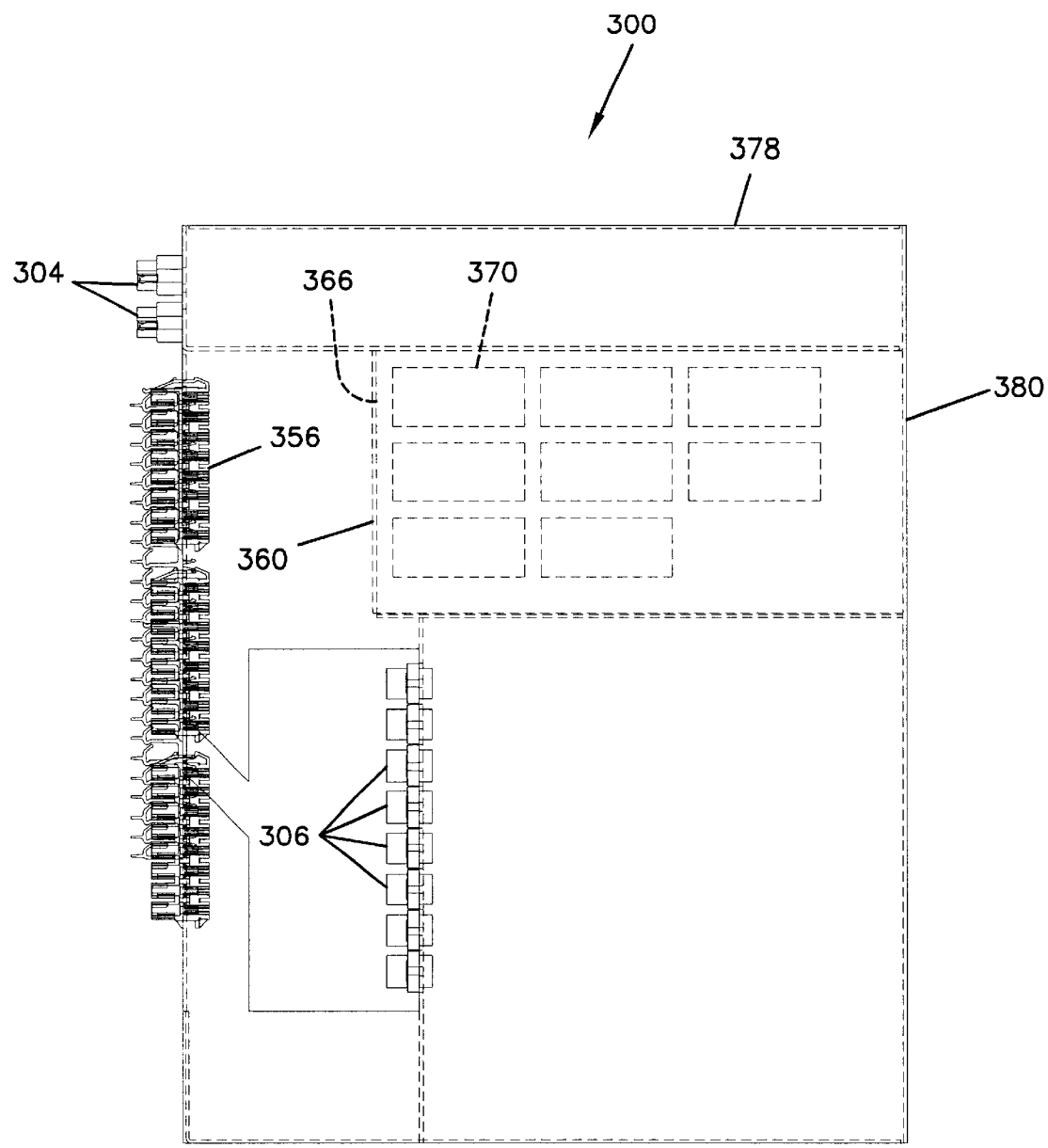
FIG. 17 is a side view of the equipment of FIG. 15, showing internal features.
Figure 18:
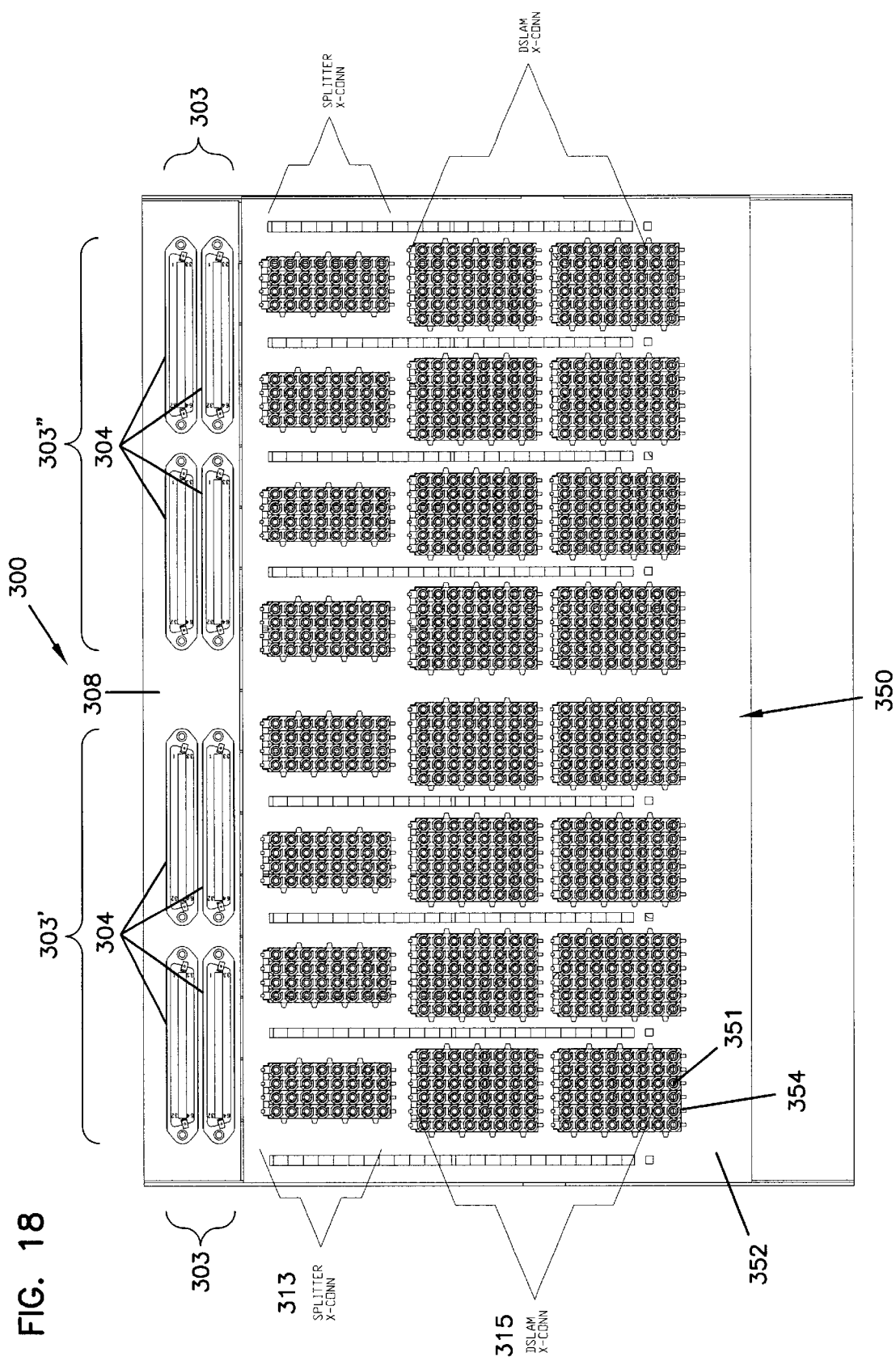
FIG. 18 is a front view of the equipment of FIG. 15.
Figure 19:
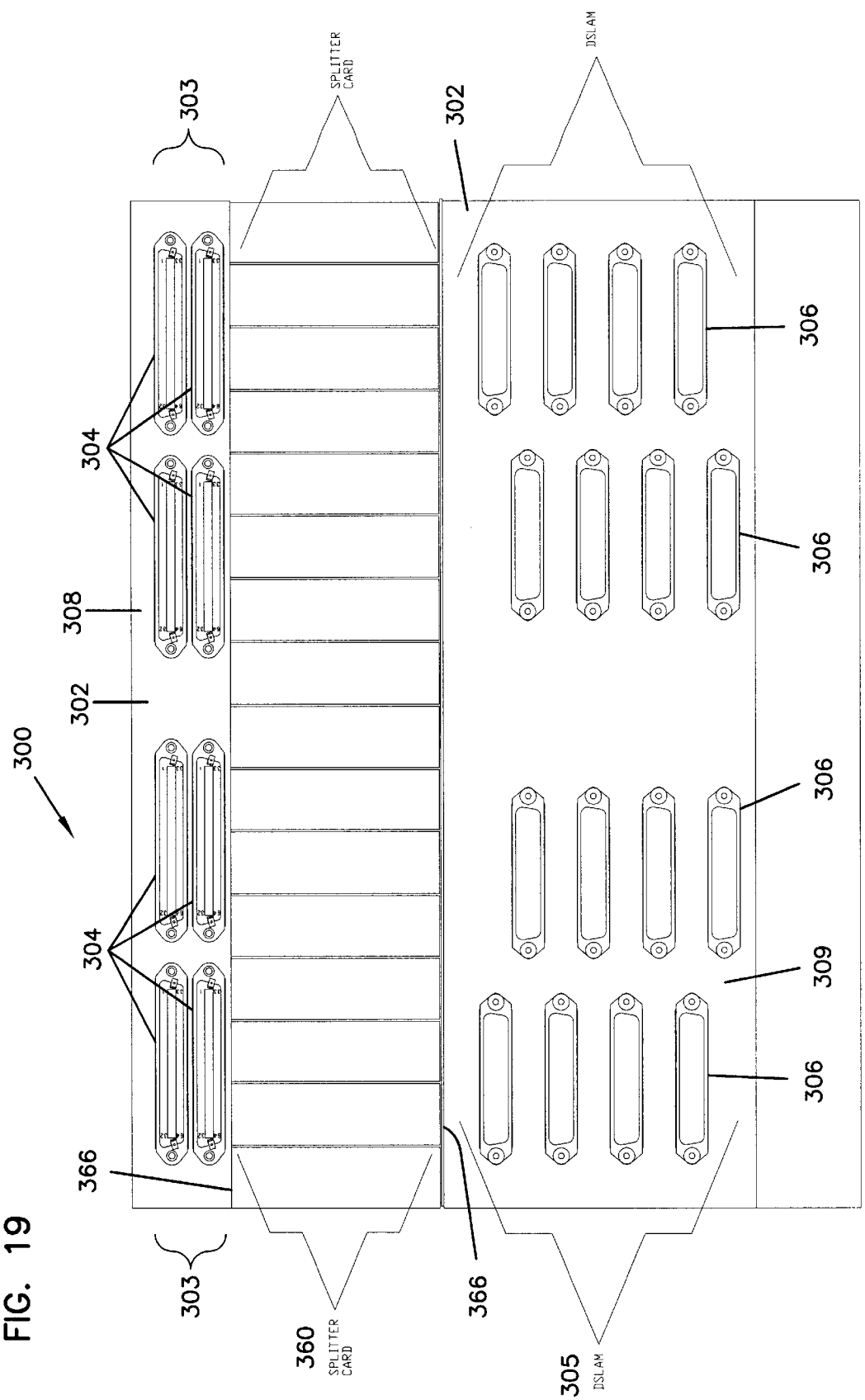
FIG. 19 is a front view of the equipment of FIG. 15, with the front door removed, exposing the grooming panel and the splitter cards.
Figure 20:
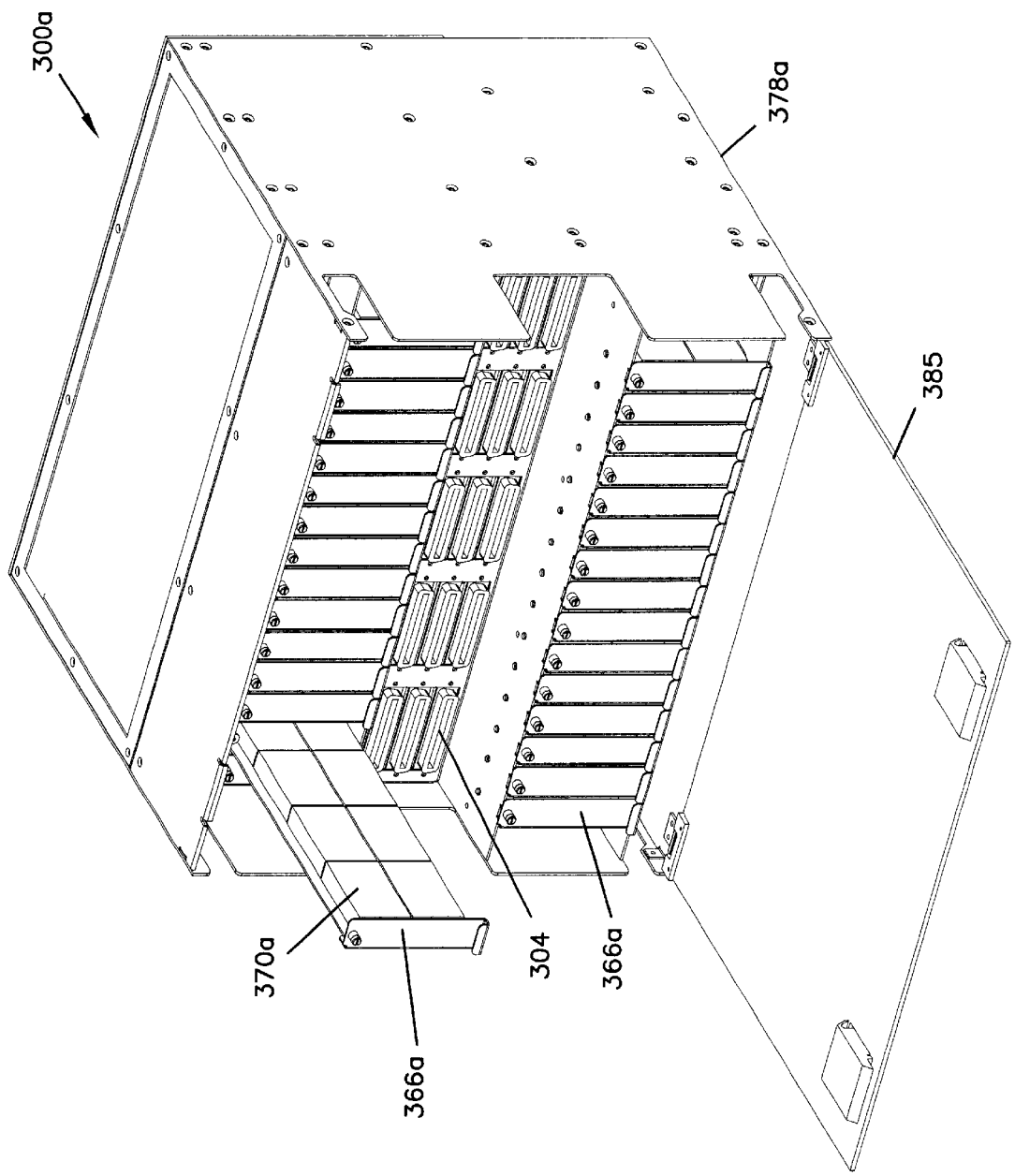
FIG. 20 is a perspective view of a further embodiment of a telecommunications equipment including a grooming panel and a POTS splitter device.

In the systems of FIGS. 4 and 5, POTS splitter device 16 is linked through multi-pair cable and connectors to DSLAM 18. Through grooming as noted above, more efficient use of the cables and connectors of MDF 12 and POTS splitter device 16 is possible. By including a POTS splitter feature internal to equipment 300, a further savings of space, and multi-pair cables and connectors is possible. Referring now to FIG. 9, equipment 300 is shown in schematic form with connectors 306 from a first array 305 linked to DSLAMs 18. Connectors 304 from first array 303 are linked to MDF 12. The one-to-one connections link to first and second arrays 313, 315 of connectors 351 of cross-connect panel 352. Patch cables 390 link connectors 351 to DSLAMs 18 and to the low pass filters 370 of the internal POTS splitter feature. FIG. 9 also shows a direct pass of the data only signals to DSLAMs 18.

Referring now to FIGS. 20–23, a further embodiment of equipment 300a is shown without a cross-connect panel 352 as in equipment 300. Equipment 300a includes first and second arrays 300a, 305a of connectors 304. In the example shown, connectors 304 are of the same 25 pin type as noted above. Array 303a connects to MDF 12, and array 305a connects to DSLAMs 18. From the rear of each connectors 304 in sub-array 303a', connections are made to the low pass filters 370a for splitter cards 366a. Splitter cards 366a are preferably slideably mounted to chassis 378a for accessibility in making connections to connectors 304 of sub-array 303a'. For the voice signals from low pass filters 370a, connections are also made to the rear of connectors 304 of sub-array 303a". For the data signals from sub-array 303a', connections are made to the rear of each respective DSLAM connector 304 of second array 305a. These connections are groomed within chassis 378a as noted above for the discussion of FIG. 3 for efficient use of the MDF connectors 304 of first array 303a.

Figure 21:
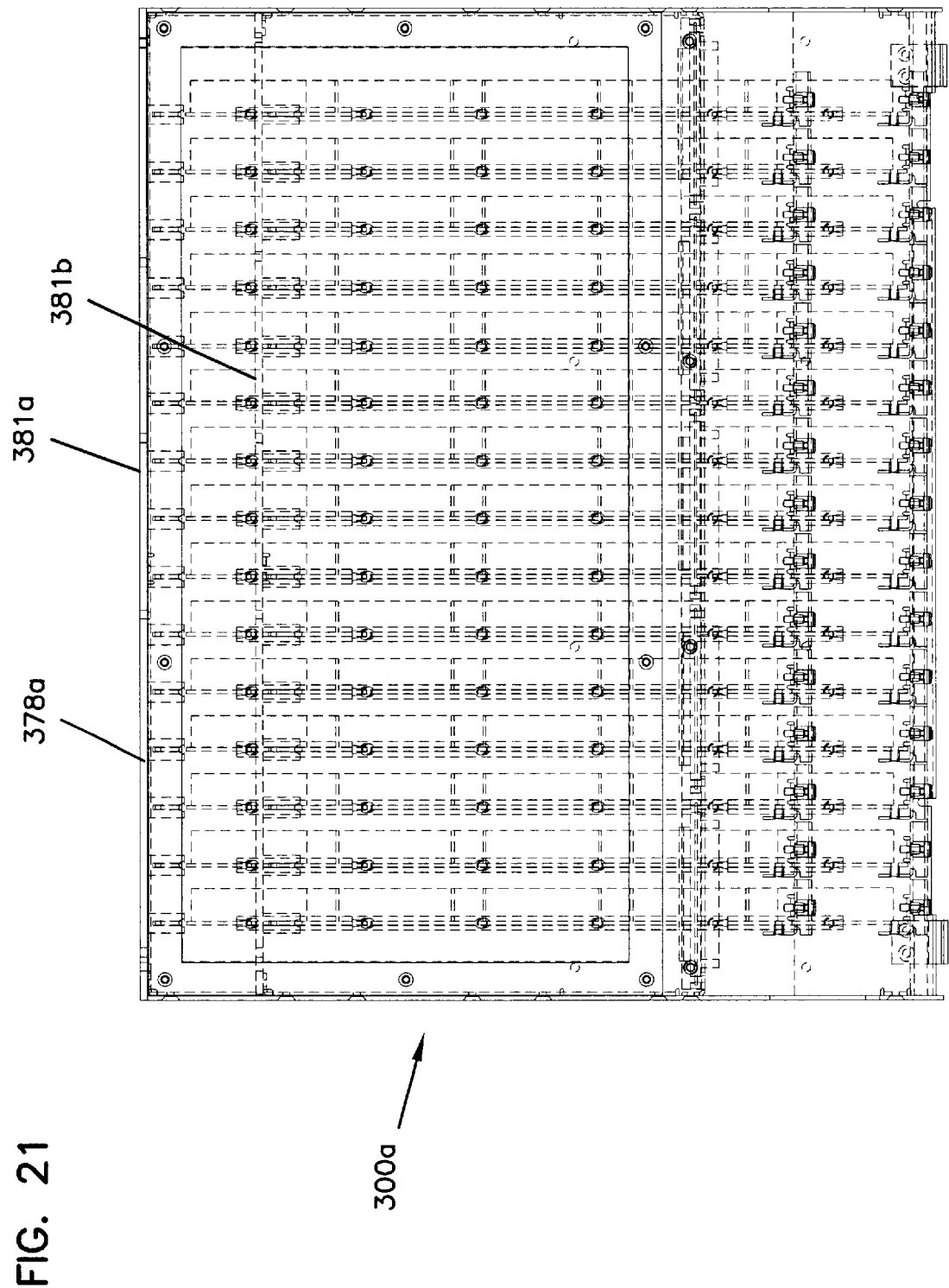
FIG. 21 is a top view of the equipment of FIG. 20, showing internal features.
Figure 22:
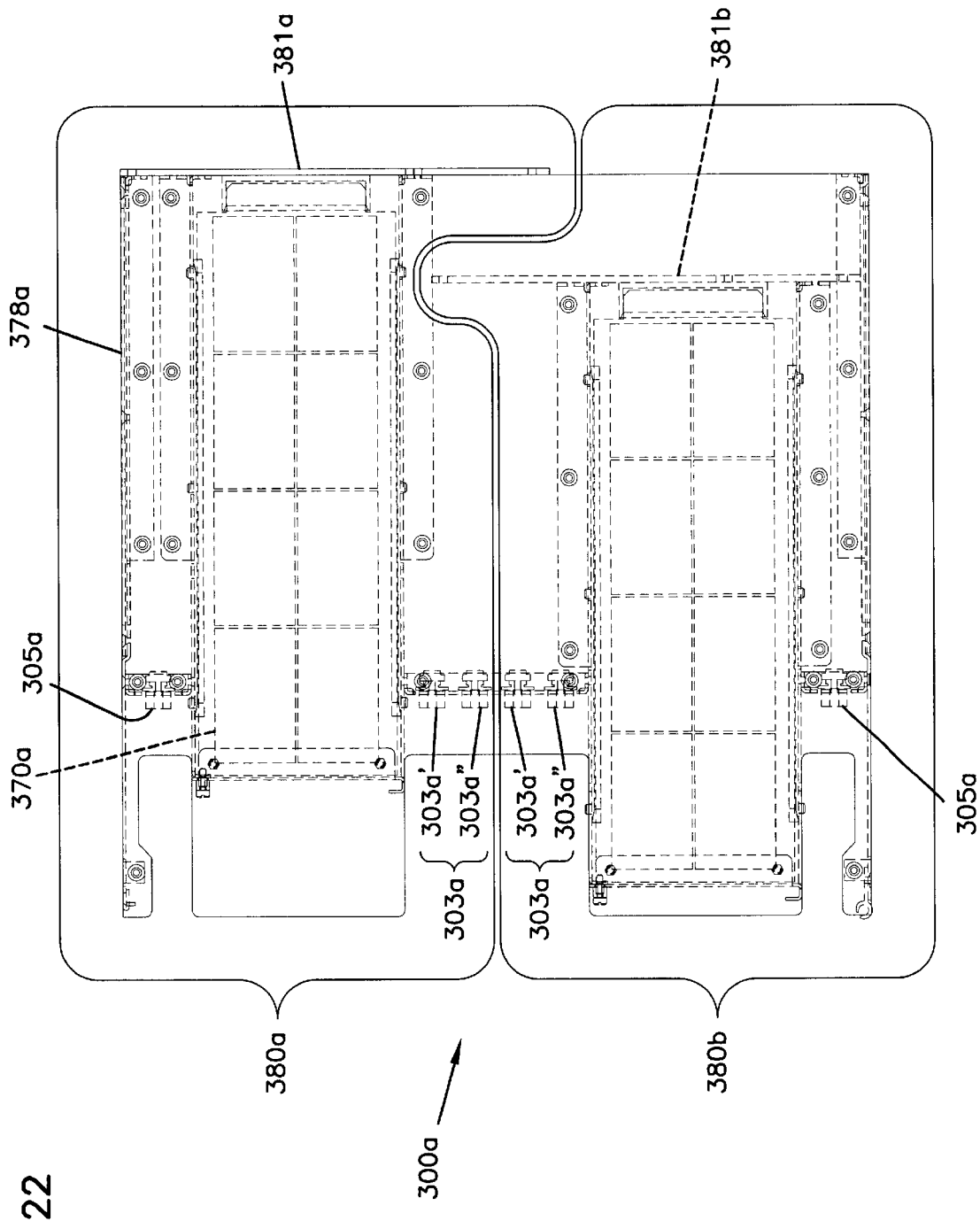
FIG. 22 is a side view of the equipment of FIG. 20 showing internal features.
Figure 23:
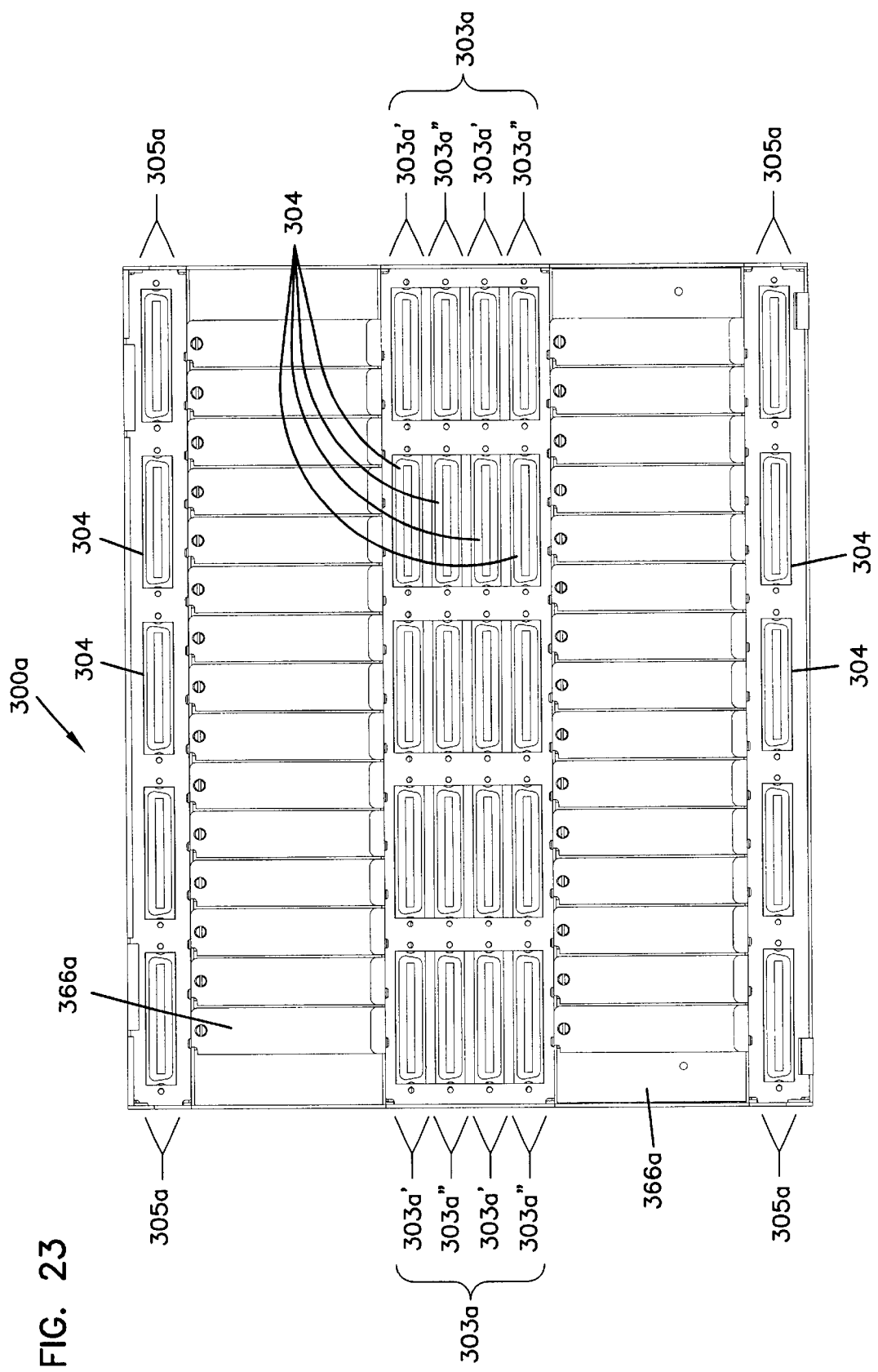
FIG. 23 is a front view of the equipment of FIG. 20.

In FIGS. 20–23, equipment 300a includes a chassis 378a with two DSLAM sub-systems 380a, 380b of connectors 304 and splitter cards 366a. Each sub-system 380a, 380b includes its own backplane 381a, 381b. As shown in FIGS. 21 and 22, the backplanes 381a, 381b with circuit paths thereon are staggered in parallel planes, allowing overlap. This results in a space savings relative to a non-overlapping design. Chassis 378a includes a hinged front panel 385.

The POTS splitter circuits noted above may also operate to separate low frequency data signals, such as ISDN (Integrated Services Digital Network) signals, from high frequency data signals. Such use will be described in greater detail below.

Figure 8:
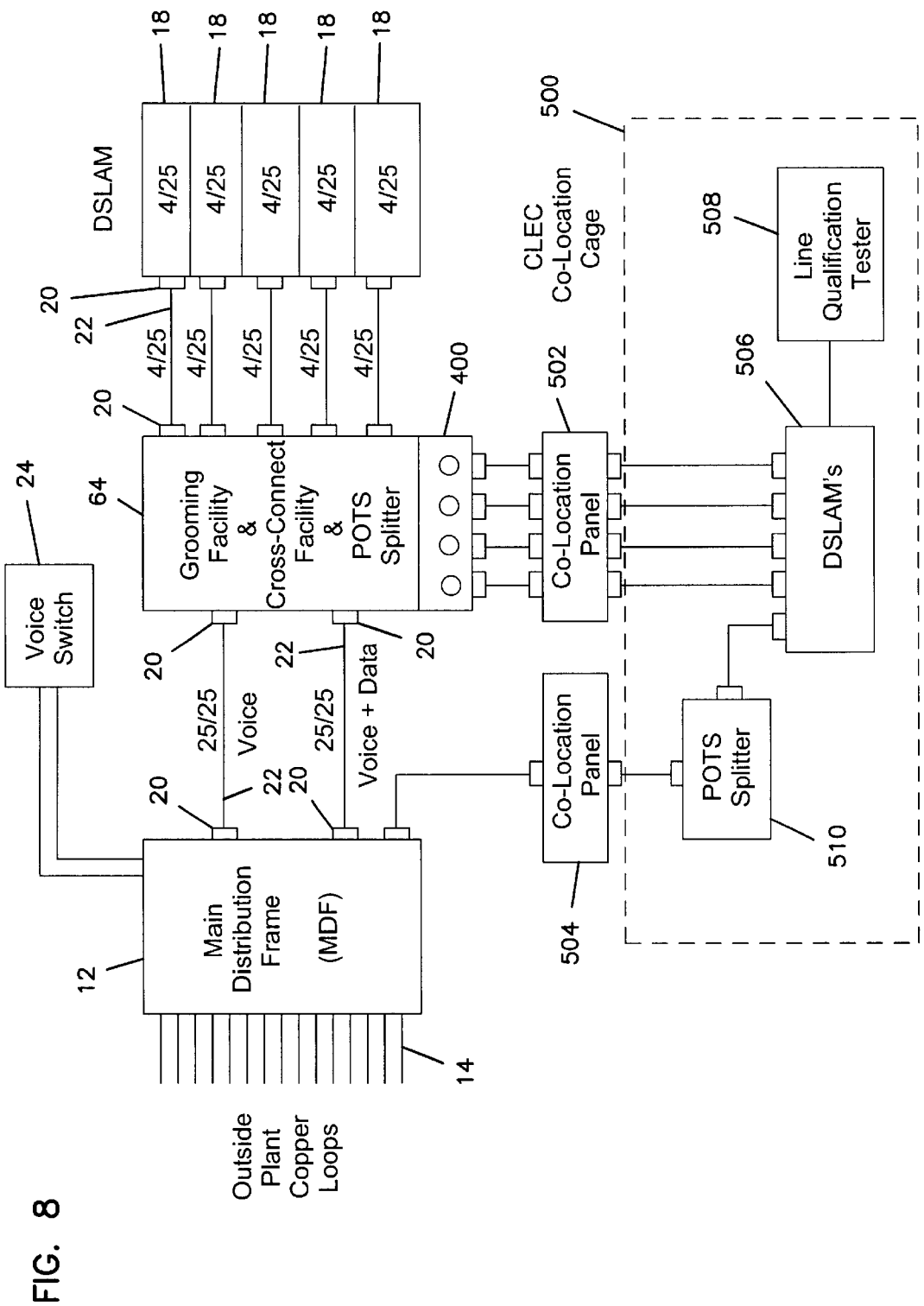
FIG. 8 is a diagram of a further telecommunications system embodiment including the features shown in the system of FIG. 6, and further including access jacks and a co-location cage.

Referring now to FIG. 8, access jacks 400 are provided to monitor signals associated with facility 64. FIG. 8 also shows a co-location cage 500. As will be discussed in greater detail hereinbelow, the co-location cage 500 represents a partitioned section of an Incumbent Local Exchange Carrier's (ILEC) central office in which equipment owned and operated by a Competitive Local Exchange Carrier (CLEC) is located. The term ILEC refers to a primary existing central office carrier, as distinguished from a new competitive carrier (CLEC) that came into existence after federal deregulation of the telecommunications industry. Co-location cage 500 includes a CLEC's DSLAMs 506, line qualification tester 508, and may further include a number of POTS splitter devices 510. Co-location panels 502, 504 provide a termination location for establishing electrical connectivity between ILEC and CLEC equipment.

Within the context of the embodiment depicted in FIG. 8, telecommunications unit 64, which incorporates a test access capability via access jacks 400, represents a demarcation location or apparatus that defines a physical point of separation between the equipment owned/managed by the ILEC and that owned/managed by the CLEC. Direct access to each of the lines passing between the ILEC and CLEC equipment permits each entity the opportunity to monitor individual lines and to determine the location and responsibility of a given problem, should one arise. The structure and functionality of the access jacks 400 and electrical plugs which are received by the jacks 400 are known in the art. Alternatively, the electronic cross-connect facility of telecommunications unit 64, which is described in detail hereinbelow, may be controlled to connect a monitoring bus to a particular customer's line, which effectively emulates the mechanical jack/plug mechanism that provides for monitoring of selected customer lines.

In addition to the many advantages that are realizable through employment of the grooming, cross-connecting, and POTS splitting apparatus embodiments discussed above, a number of electronic capabilities may be incorporated that enhance, augment, emulate, and/or replace various mechanical aspects of the above-described apparatus embodiments. In accordance with the embodiment shown in FIG. 24, for example, the manual grooming, cross-connecting, POTS splitting, and monitoring capabilities previously described hereinabove may be enhanced by the addition of an electronic cross-connect facility 1004, and further enhanced by incorporation of a loop qualification tester 1005 or other type of line tester.

The telecommunications unit 1000 depicted in FIG. 24 is shown to include a POTS splitter device 1001, a manual grooming facility 1002, and a manual cross-connect facility 1003. According to one embodiment of the present invention, which may be regarded as a hybrid embodiment, the telecommunications unit 1000 may, in addition to the manual cross-connect facility 1003, further include an electronic cross-connect facility 1004. Incorporation of the electronic cross-connect facility 1004 in telecommunications unit 1000 provides technicians the ability to locally or remotely establish cross-connections electronically, and may wholly eliminate the need to manually establish such connections via hardwired or patch connections. Inclusion of a manual cross-connect facility 1003, however, may enhance the ability to establish cross-connections under certain circumstances, such as during power outages or under circumstances in which the ability to electronically effect such cross-connections is limited.

Figure 25:
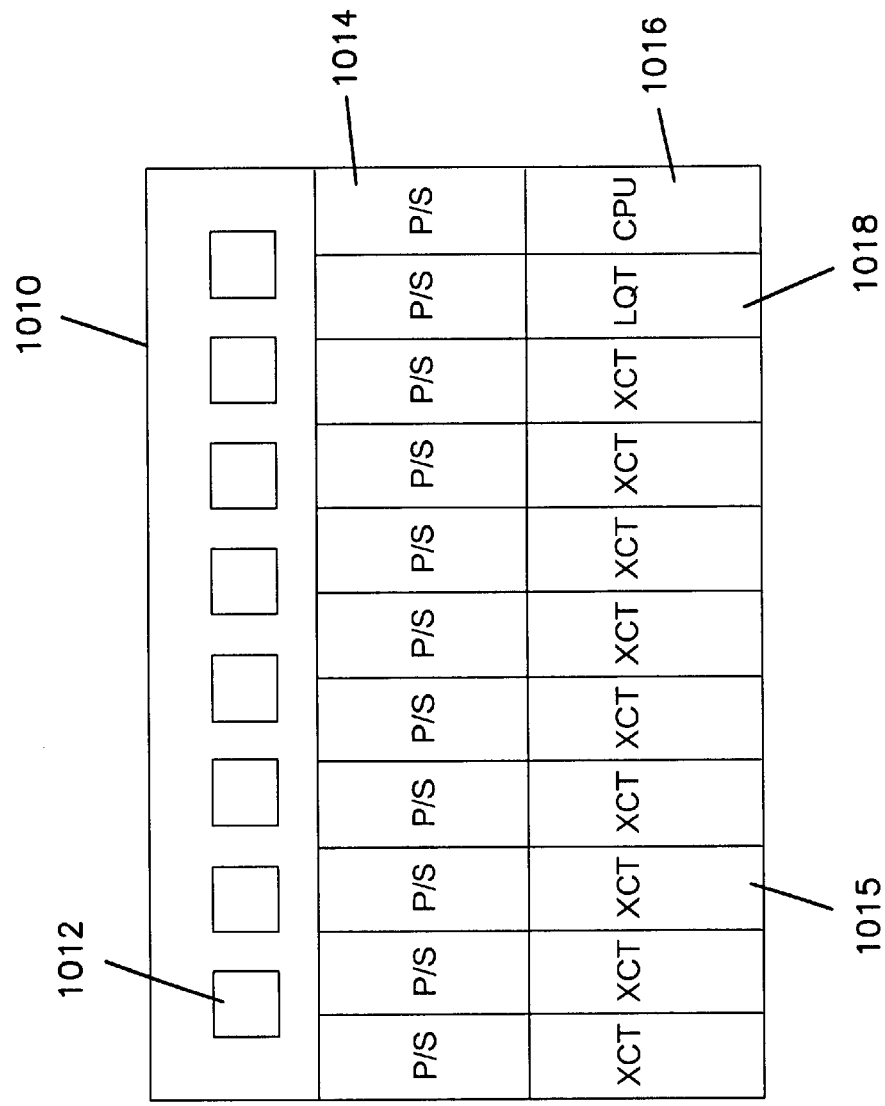
FIG. 25 is an illustration showing various components of a telecommunications system which incorporates electronic cross-connect, grooming, and POTS splitting capabilities in accordance with an embodiment of the present invention.

Alternatively, and as depicted in FIG. 25, telecommunications unit 1010 may be implemented to include capabilities for performing all grooming, cross-connecting, and POTS splitting functions electronically. According to this embodiment, the manual grooming and cross-connect facilities 1002, 1003 would not be needed and, as such, may be excluded from the unit 1010. Employment of an electronic cross-connect facility 1004 in telecommunications unit 1000 provides the ability to perform all grooming, cross-connecting, and POTS splitting functions electronically and, in one embodiment, from a host processor located remotely from telecommunications unit 1000. It will be understood that electronic control of telecommunications unit 1000 may also be effected by use of a host processor situated proximate telecommunications unit 1000 through use of an appropriate communication interface.

As stated above, a significant advantage realized through employment of a telecommunications unit 1000 provided with an electronic cross-connect facility 1004 concerns the ability to perform all cross-connection, grooming, and POTS splitting functions electronically from a location remote from the central office. This capability is particularly important in light of recent federal mandates in the United States the define the relationship between incumbent carries and non-incumbent "competitive" carries. It will be appreciated that the advantages associated with employment of an electronic cross-connect facility 1004 according to the present are equally realizable in the context of telecommunications systems not impacted by such federal mandates, such as those situated outside of the United States.

Recent rulings promulgated by the Federal Communications Commission (FCC) and U.S. Congress have clarified the relationship and obligations between Incumbent Local Exchange Carriers (ILECs) and Competitive Local Exchange Carriers (CLECs). A recent FCC Order directed to "line sharing" requires that ILECs must provide unbundled access to the high frequency bandwidth (e.g., data band) of the local loop to any CLEC that seeks to deploy any version of xDSL which is presumed to be acceptable for shared line deployment in accordance with the rules adopted in the Order. In short, an ILEC must provide physical space in its central office, such as the co-location cage depicted in FIG. 8, to a CLEC, and must also provide access to the ILEC's main distribution frame. From the consumer's perspective, the federally mandated interrelationship between ILECs and CLECs has provided the consumer with a wide variety of telecommunication service options, including, in particular, ADSL, IDSL (Internet DSL), SDSL (Symmetric DSL), and VDSL (Very high speed DSL) services.

A CLEC technician, for example, may access the telecommunications unit 1010 shown in FIG. 25 remotely to perform a variety of tasks, without ever having to gain admittance to the CLEC's co-location cage established in the ILEC's central office. The CLEC technician may implement a customer's change of service request from, for example, an IDSL service to an ADSL service entirely remotely.

In accordance with one example of the above-described procedures, a software program running on a host processor remote from the ILEC's central office provides the CLEC technician with the ability to effect necessary cross-connections by electronically controlling a cross-connect field or matrix provided in the electronic cross-connect facility 1004 shown generally in FIG. 24. In order to provide the customer with a requested ADSL service, for example, the customer's line would be electronically switched from the customer's existing IDSL DSLAM connection (e.g., a data only connection) to an ADSL DSLAM connection (e.g., a single mixed data/voice connection), for purposes of handling digital data transmissions to and from the customer's location, and also to a POTS splitter facility 1001, for purposes of handling voice signal transmissions to and from the customer's location.

In addition to electronic cross-connect switching that occurs to provide the customer's requested change of service, the electronic cross-connect facility 1004 may be remotely controlled to perform any grooming that would assist in reducing the number of non-active connections which would otherwise be sent to the main distribution frame using a conventional connection approach, as was previously discussed hereinabove. Also, prior to providing ADSL service to the customer, the electronic cross-connect facility 1003 may be remotely controlled to switch the customer's line to a loop qualification tester 1005 or other type of tester to evaluate the suitability of the customer's line for supporting an ADSL service.

Figure 26:
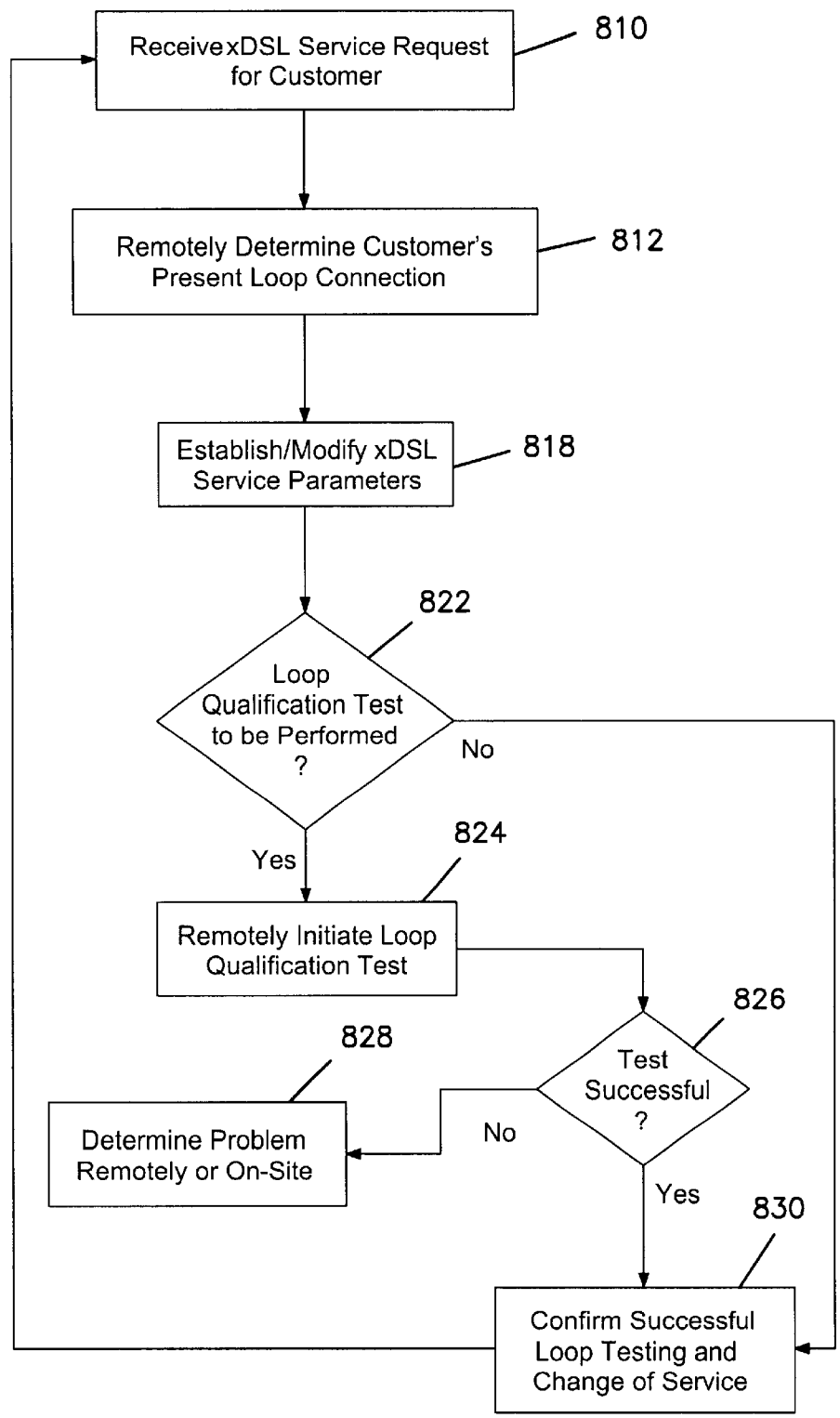
FIG. 26 is a flow diagram showing several steps involved in remotely establishing or modifying a customer's xDSL service in accordance with the principles of the present invention.

FIG. 26 illustrates in flow diagram form several steps involving the establishing of cross-connections remotely in accordance with an embodiment of the present invention. A CLEC may receive 810 an xDSL service request for a particular customer who requires access to the telecommunications unit 1010 (see, e.g., FIG. 25) situated in the CLEC's co-location cage at the ILEC's central office. The CLEC technician remotely determines 812 the status and characteristics of the customer's current loop connection, such as the customer's current xDSL service(s) and DSLAM connection configuration.

Depending on the nature of the service request, the CLEC technician determines the xDSL service parameters needed to establish the xDSL connection nd/or determines the extent to which applicable xDSL service parameters require adjustment 818. For example, if a DSLAM connection change is required, the CLEC technician interacts with the configuration software operating on the CLEC's host processor to electronically establish or modify the necessary cross-connections to disconnect the customer's line from the current DSLAM and to connect the customer's line to a new DSLAM. The CLEC technician may then make the necessary adjustments 818 to the xDSL connection/service parameters to satisfy the customer's xDSL service request.

When establishing or making a change of service that affects the customer's connection, it may be desired or required to perform certain tests to determine the suitability of the customer's line for supporting particular telecommunication services. If, for example, a loop qualification test is to be performed 822, then the CLEC technician may remotely conduct the necessary tests that qualify or disqualify the customer's line for purposes of supporting a particular xDSL service. Establishing the necessary connections between the tester/tester card and the customer's line may be accomplished remotely by the CLEC technician.

In one embodiment, a test bus distinct from the cross-connect relay matrices is controlled to connect a given tester to a particular customer's line. In an alternative embodiment, the cross-connect relay matrices are used to controllably connect a given tester to a particular customer's line. A loop qualification test or other type of line test is initiated 824 remotely by the CLEC technician. If the loop test is successful 826, confirmation of same and of a successful change of service is reported 830 to the remote host processor. If the loop test is unsuccessful, remote troubleshooting may be initiated 828 and/or a technician may be dispatched to the central office to conduct an on-site evaluation of the telecommunications unit 1010.

By way of example, the cross-connect relay matrices may be used to controllably establish connections, including short-circuit connections, and decouple connections for purposes of conducting troubleshooting and diagnostic analysis. For example, a cross-connect relay matrix may be controlled to disconnect a customer's DSLAM connection to isolate the customer's voice connection or to disconnect the POTS splitter from the customer's composite (e.g., ADSL) data signal path. By way of further example, a connection between a composite signal input and a DSLAM signal output may be established so as to bypass a POTS splitter.

A short-circuit may be established using a cross-connect relay matrix to short-circuit composite data signal Tip and Ring conductors or to short-circuit the POTS splitter output signal Tip and Ring conductors, for example. A cross-connect relay matrix may further be used to connect a composite signal line to a tester for loop qualification testing, as previously discussed above. It will be appreciated that a significantly enhanced cross-connection capability is realized for establishing connections between communication lines and various types of equipment by employment of an electronic cross-connection methodology of the present invention.

According to the embodiment depicted in FIG. 25, telecommunications unit 1010 includes an electronic cross-connect facility provided by a number of cross-connect matrix cards or modules 1015. Each cross-connect matrix card 1015 includes one or more switching matrices or fields which are controlled by a central processing unit (CPU) 1016 provided in telecommunications unit 1010. A communications card (not shown) is also incorporated as part of telecommunications unit 1010 to provide communication connectivity with a local or remote host processor via an appropriate interface or network connection. Telecommunications unit 1010 includes one or more backplanes to provide for the requisite interconnection of signal and power lines.

Also provided in telecommunications unit 1010 are a number of POTS splitter cards or modules 1012. As is best shown in FIGS. 27 and 28, each POTS splitter card 1012 typically includes a number of filters which are used to low pass filter a mixed or composite voice/data signal for purposes of passing the relatively lower frequency voice content of the composite signal and rejecting the relatively high frequency data content of the mixed or composite signal.

By way of example, it is assumed that the composite signal communicated to one of a number of POTS splitter circuits 1020 provided on POTS splitter card 1012 conforms to an ASDL standard. An ASDL signal is applied to an input 1022 of the POTS splitter circuit 1020 and is received by a low-pass filter 1025. The low-pass filter 1025 passes composite signal content associated with the voice band (e.g., less than about 4 kHz) and rejects composite signal content above the voice band, such as frequencies associated with the data band (e.g., about 30 kHz and above). The composite signal is also communicated to a data output 1024 which may or may not include a high-pass filter (not shown). It is assumed that the DSLAM or other digital multiplexer that receives the composite signal from the data output 1024 of the POTS splitter circuit 1020 provides any required high-pass filter elements to remove the relatively low-frequency voice signal content from the composite signal.

As is shown in FIGS. 27 and 28, the POTS splitter circuit 1020 may also operate to separate low frequency data signals, such as ISDN (Integrated Services Digital Network) signals, from high frequency data signals. According to an embodiment in which telecommunications unit 1000 (FIG. 24) or 1010 (FIG. 25) provides for cross-connection and/or grooming of high and low frequency data connections, exclusive of or in addition to voice band connections, the POTS splitter circuit 1020 shown in FIG. 27 would instead be representative of an ISDN filter circuit. In this case, the low-pass filter 1025 shown in FIG. 28 is replaced with an ISDN filter.

In accordance with this embodiment, a filtered ISDN signal provided at low frequency data output 1026 is transmitted to a voice switch equipped with ISDN interface line cards instead of POTS line cards. A telecommunications unit 1010, such as that shown in FIG. 25, would include ISDN filter modules 1014, rather than POTS splitter modules 1014. In a further embodiment, telecommunications unit 1010 may include both ISDN filter modules 1014 and POTS splitter modules 1014.

An embodiment of the present invention that accommodates high and low data frequency signals is particularly well-suited for deployment in European countries where ISDN service is the "Plain Old Telephone Service," albeit a digital service. It is understood that the mechanical and electronic features and advantages described herein with respect to POTS telecommunications system architectures are equally applicable to telecommunications systems which provide for the transmission of high and low frequency digital data signals.

It is noted that one or more notch filters may be coupled to receive the composite signal from the data output 1024 of the POTS splitter circuit 1020 for purposes of detecting any billing tones that may be transmitted along the ASDL signal connectivity path established through the POTS splitter circuit 1020, as is often the case in European telecommunication systems. Such billing tones typically have frequencies that range between the voice band and the data band. Impedance matching circuits 1023, 1027, and 1029 provide for proper impedance matching at the signal input 1022, data output 1024, and voice output 1026 nodes, respectively, of the POTS splitter circuit 1020.

Telecommunications unit 1010 may further include a loop qualification test card 1018 or other type of test card or test card interface 1018. The test card 1018 may be electronically connected to a selected customer's line connection in response to control signals received from a local or remote host processor. The test card 1018 may further include test devices and employ test algorithms for performing various self-diagnostic tests in addition to performing customer line/loop testing. A suspect component or card of telecommunications unit 1010 may, for example, be electronically coupled to a particular test card 1018 and/or particular test sub-system of the test card 1018.

The remote or local technician may then interrogate the suspect component or card and perform a desired diagnostic test thereon, the results of which are transmitted to the local/remote host processor in real-time or upon completion as a batch transfer of the diagnostic data. Any needed re-configuration of the telecommunications unit 1010 or resolution of a detected problem may be implemented remotely, such as by establishing an alternative cross-connection to bypass the defective or suspect component/card.

Telecommunications unit 1010 further includes a number of communication line connectors (e.g., Telco connectors) 1012 or ports which provide for connectivity to/from a main distribution frame and to/from any number of DSLAM or other multiplexing devices. Cross-connection and grooming operations with respect to MDF and DSLAM signal paths are accomplished through use of the cross-connect matrices or fields provided on cross-connect cards 1015. Connection of particular lines, such as ADSL lines which carry mixed voice/data signals, to a POTS splitter module 1014 is also accomplished through use of one or more of the cross-connect matrix modules 1015.

Figure 29:
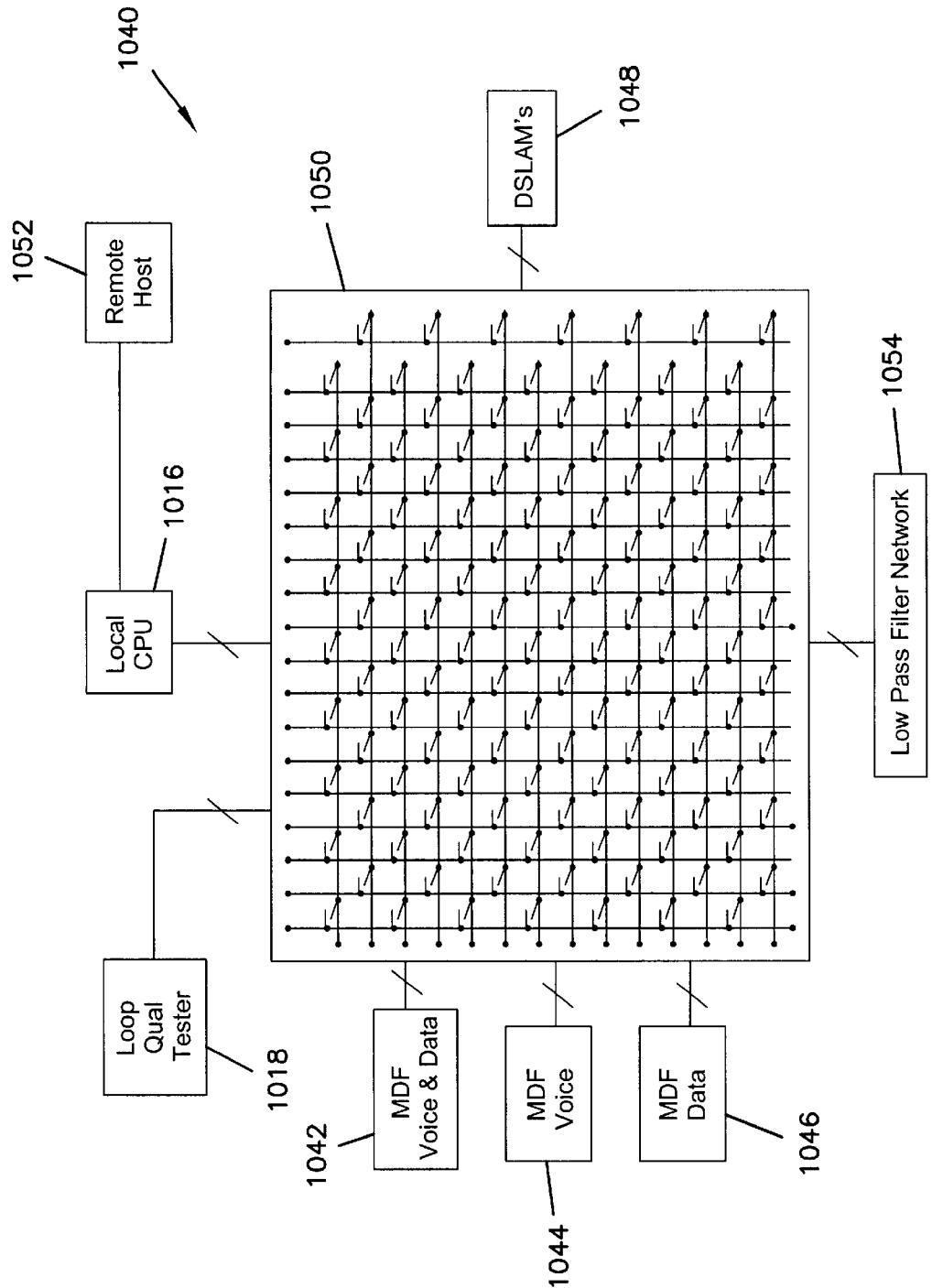
FIG. 29 is a block diagram of a telecommunications unit which includes electronic cross-connect, grooming, and POTS splitter capabilities according to an embodiment of the present invention.

Referring now to FIG. 29, there is shown a depiction of a telecommunications unit 1040 which employs a cross-connect field 1050 to establish signal connectivity paths between a number of different components, each of which is electrically coupled to the cross-connect field 1050. Various MDF connections 1042, 1044, 1046 which carry composite voice/data signals, exclusively voice signals, and exclusively data signals, respectively, are shown coupled to the cross-connect field 1050. A number of DSLAMs 1048 and low pass filter elements 1054 (i.e., POTS splitter filters) are also shown coupled to the cross-connect field 1050, as are one or more loop/line qualification testers 1018. A local CPU 1016 coordinates the switching of the cross-connect field 1050, typically in response to control signals received from a remote host 1052, although it is understood that a host processor situated proximate or integrated as part of the telecommunications unit 1040 may be employed to generate the control signals received by the local CPU 1016. It is understood that the relay control functions performed by the local CPU 1016 may alternatively be performed by a microcontroller.

The cross-connect field 1050 shown in FIG. 29 may be configured in a number of different ways to achieve desired functionality and a desired balance between the number of relays and control lines needed to implement a desired switching strategy. By way of example, one cross-connect field embodiment may include a standard switching matrix configuration by which relays are used to switch all conductors one to each other. According to another embodiment, the cross-connect field 1050 employs a configuration by which relays are used to connect TX lines to TX lines and RX lines to RX lines. Using this configuration, it is possible to switch every other line in the matrix and still keep the pairs of TX and RX lines next to each other, which advantageously results in reduced occurrences of undesirable cross-talk.

In accordance with another embodiment, the cross-connect field 1050 employs a standard configuration by which relays are used to switch each TX line to each TX line, but can also switch TX lines to RX lines and RX lines to TX lines. According to yet another cross-connect field configuration, relays are used to switch only TX lines to TX lines and RX lines to RX lines, such that these lines are being switched together in this manner at all times. This configuration advantageously provides for switching of a pair of TX and RX lines with only one relay (e.g., a two-pole relay). This configuration provides for a reduction in the complexity of the control circuitry, and maintaining this line pairing configuration advantageously minimizes cross-talk.

Implementing a standard matrix approach typically requires a cross-connect at each matrix point. Using this approach, the number of relays will be doubled. In order to reduce the number of relays, a TX cross-connect field 1050 may be used to effect TX line switching and a separate RX cross-connect field 1050 may be used to effect RX line switching. According to this approach, the number of relays may be reduced by one-half, but the amount of control circuitry will likely be doubled. This approach, however, does not provide for pairing of the TX and RX lines, as does the approach discussed above, which provides for cross-talk reduction.

Figure 30:
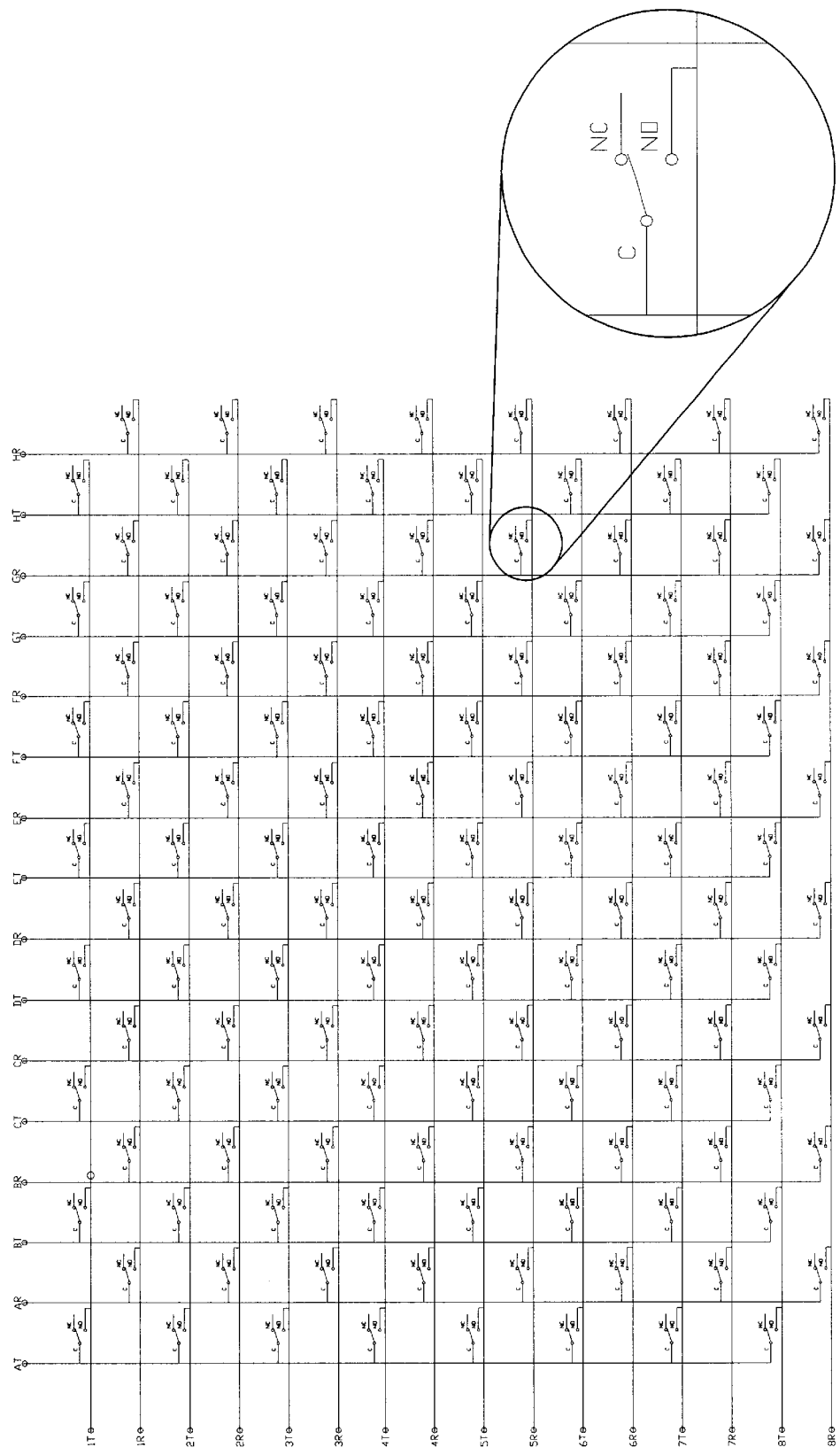
FIGS. 30–33 illustrate various embodiments of a remote controllable electronic cross-connect switching matrix in accordance with an embodiment of the present invention.
Figure 31:
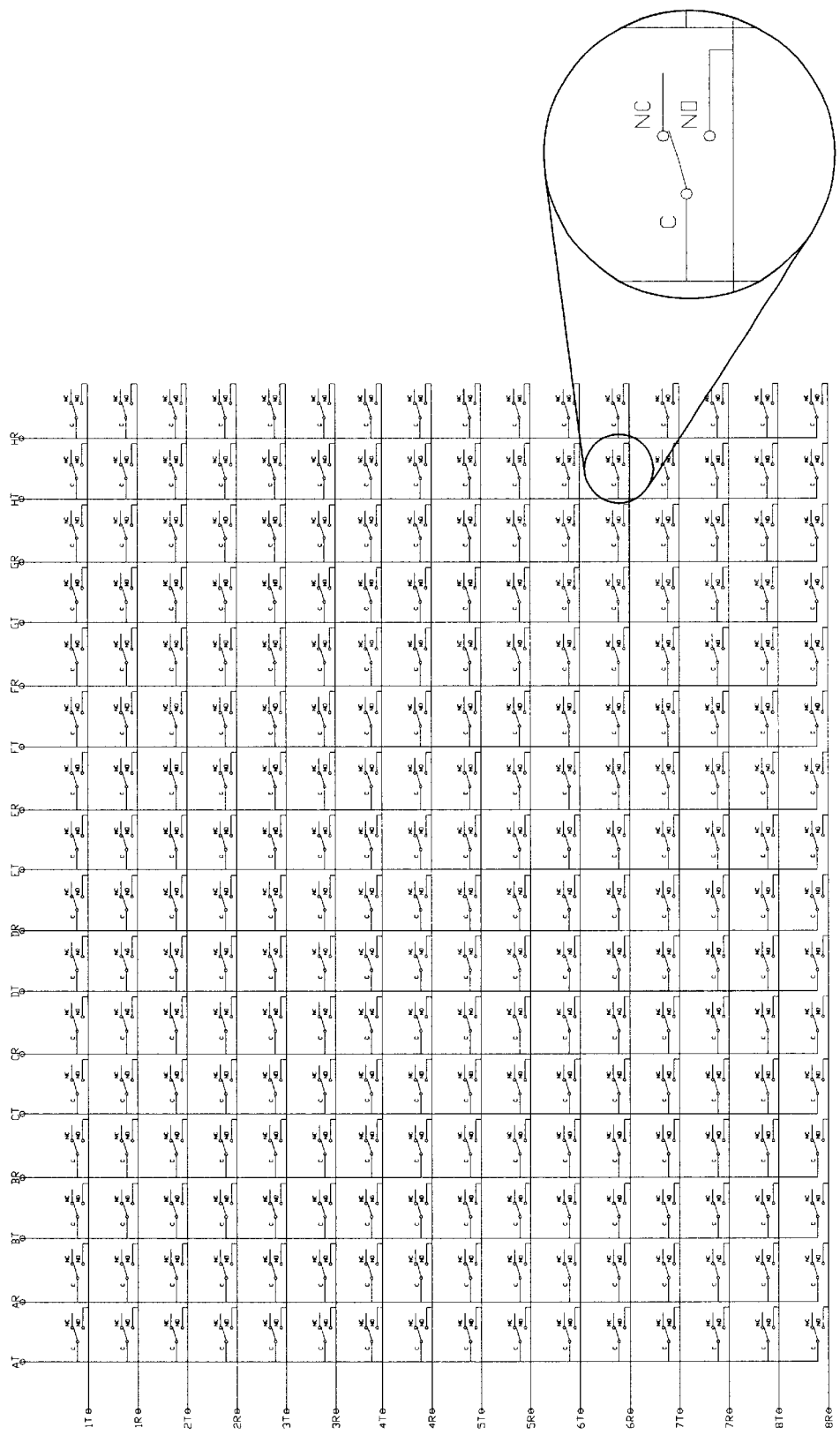

FIGS. 30–33 are schematic depictions of four cross-connect field embodiments of differing configuration and functionality. FIG. 30 illustrates a 16×16 switching matrix comprising a total of 128 contacts or relays. More particularly, the cross-connect field 1050' illustrated in FIG. 30 represents a 16×16 single wire TIP to TIP and RING to RING switching matrix. The cross-connect field 1050" shown in FIG. 31 represents a 16×16 single wire full matrix comprising 256 contacts or relays.

Figure 32:
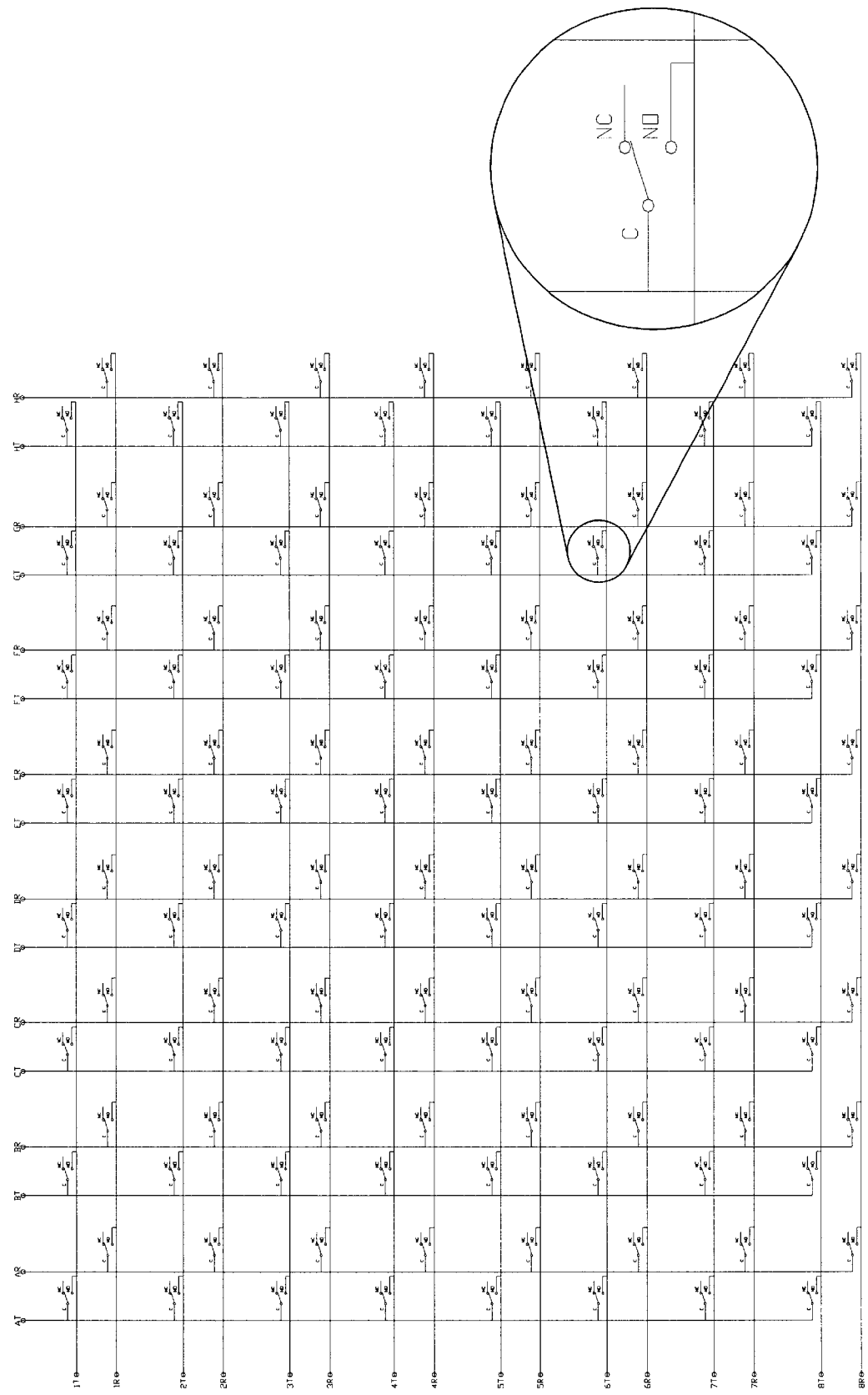
Figure 33:
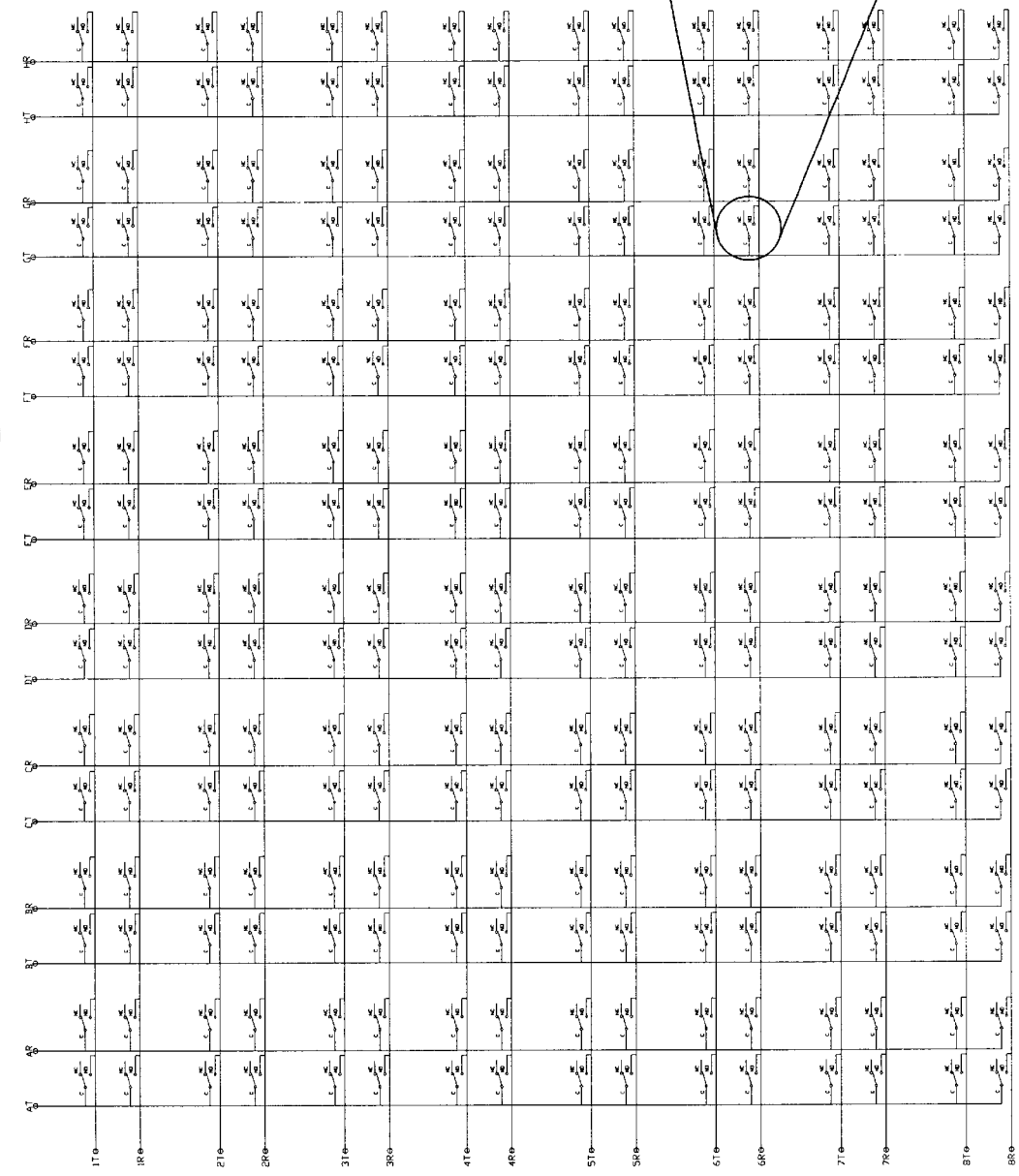

FIG. 32 illustrates a cross-connect field 1050''' which represents an 8×8 twisted pair TIP to TIP and RING to RING matrix comprising 128 contacts or relays. The cross-connect field 1050'''' shown in FIG. 33 represents an 8×8 twisted pair full matrix comprising 256 contacts or relays. It will be understood that switching matrices having configurations and functionality other than those described herein may be advantageously used in a cross-connect telecommunications unit of the present invention to effect electronically controlled cross-connect, grooming, and POTS splitting functions from a local or remote site.

A controllable electronic cross-connect field or matrix 1050 in accordance with the present invention may be implemented using a variety of technologies. By way of example, the relays or contacts of cross-connect field 1050 may be implemented as metallic contacts using known fabrication techniques, such as those commonly employed in the semiconductor industry. By way of further example, the relays of cross-connect field 1050 may be implemented on a silicon substrate using Micro Electrical Mechanical Systems (MEMS) technology or other micromachining or photolithographic technology.

A MEMS device is understood in the art as a device fabricated using advanced photolithographic and wafer processing techniques. A typical MEMS device is a three dimensional structure constructed on a semiconductor wafer using processes and equipment similar to those used by the semiconductor industry, but not limited to traditional semiconductor materials. MEMS devices are, in general, superior to their conventional counterparts in terms of cost, reliability, size, and ruggedness.

Figure 34:
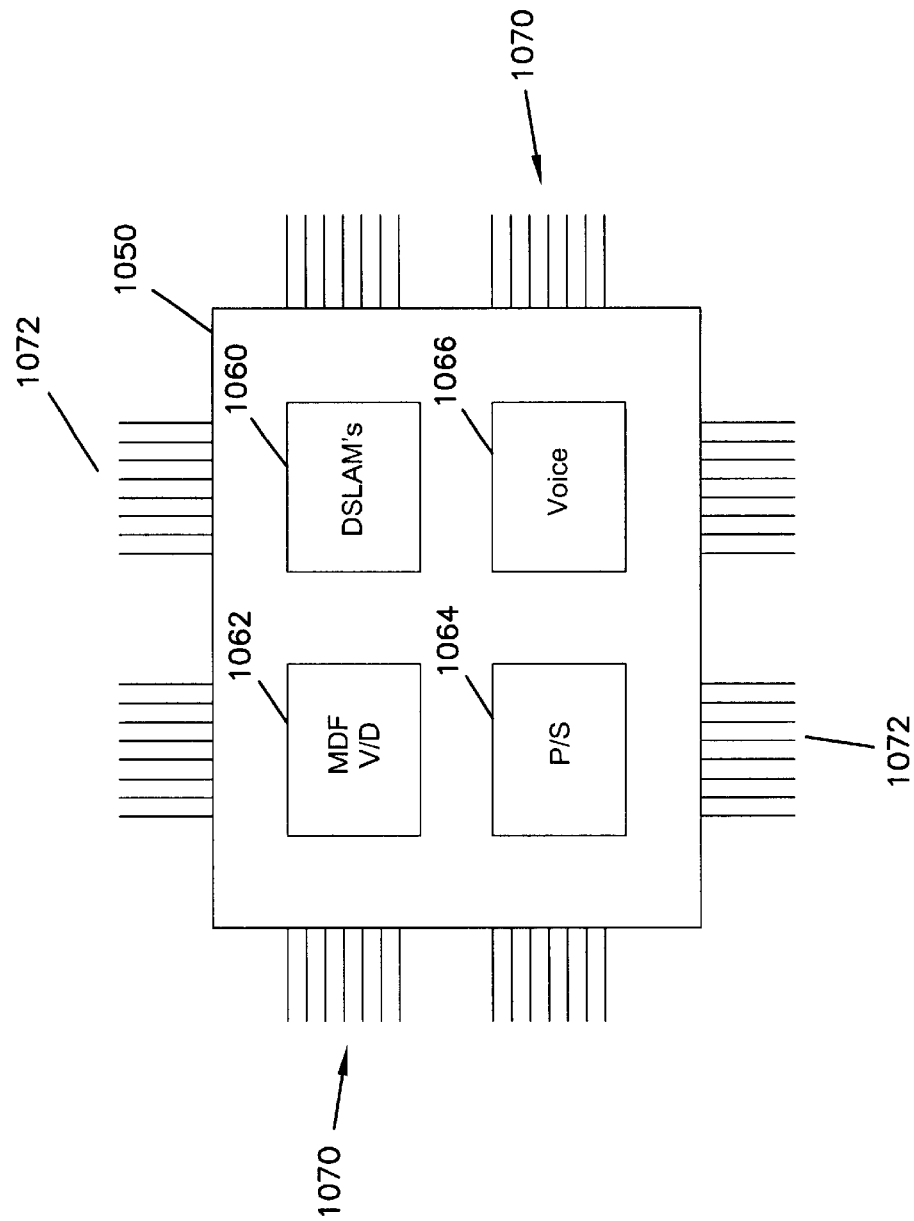
FIG. 34 is an illustration of a cross-connect switching matrix in which the matrix is partitioned into regions each associated with particular switching functions or characteristics.

FIG. 34 illustrates a cross-connect field 1050 which is partitioned into regions, with each region being associated with a specified signal type, source, destination or component. By way of example, the cross-connect field 1050 depicted in FIG. 34 includes four regions, including an MDF voice/data region 1062, a DSLAM region 1060, a POTS splitter region 1064, and a voice region 1066. Other regions, such as a line tester region (not shown), may also be provided in the cross-connect field 1050. Also shown coupled to the cross-connect field are sets of controls lines 1072 and signal lines 1070. Although partitioning of the cross-connect field 1050 is not necessary, it may be desirable to partition the cross-connect field 1050 for purposes of enhancing connection management, for example. Also, certain regions of the cross-connect field 1050 may be fabricated to exhibit characteristics differing from those of other regions for purposes of satisfying particular signal transmission and/or switching design requirements, for example.

Figure 35:
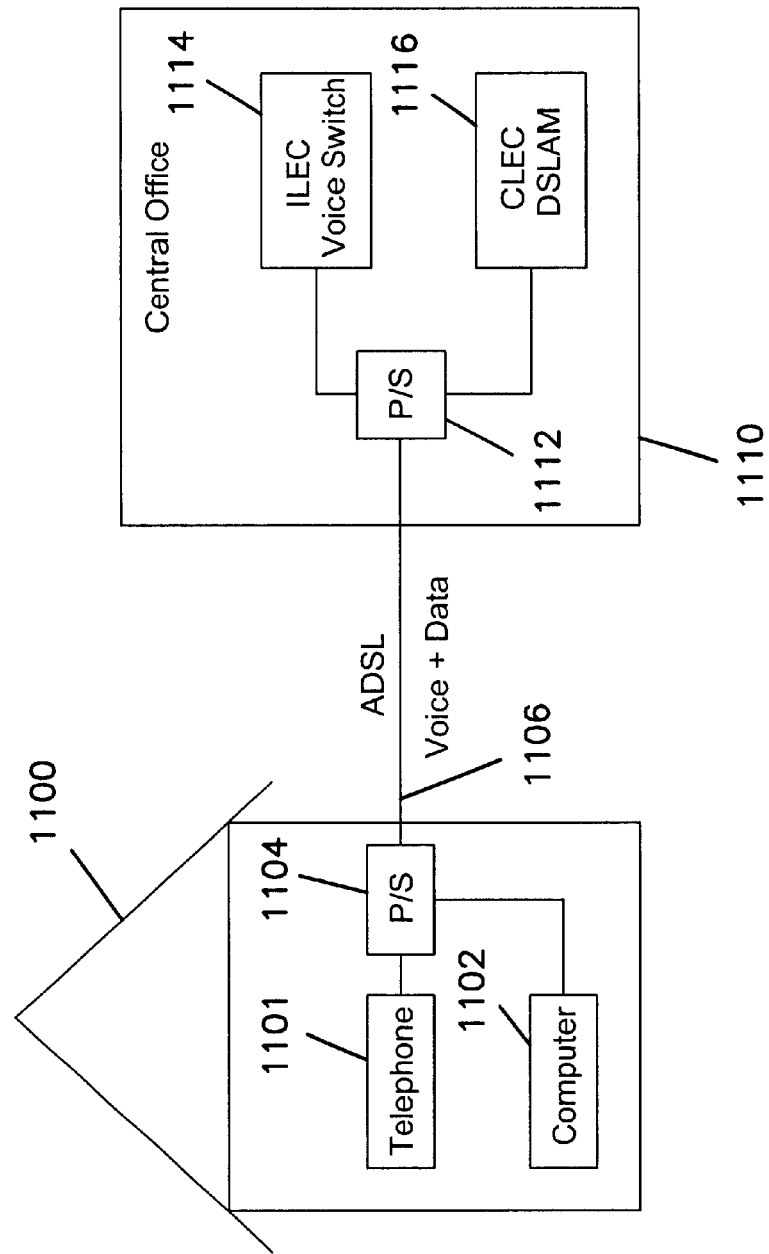
FIG. 35 is an illustration of an ADSL system deployment as between a central office and a customer's home or business.

Turning now to FIG. 35, various advantages of a remote cross-connect, grooming, and POTS splitting capability will be further discussed within the context of a particular xDSL system implementation, namely, an ADSL system implementation. FIG. 35 illustrates a customer's home or business 1100 which includes a typical telephone 1101 and a computer or PC 1102. Prior to the availability of ADSL, two separate POTS lines would have been required to allow for concurrent use of the telephone 1101 and the computer 1102. With the availability of ADSL, however, a single line 1106, which is qualified to support ADSL signaling requirements and protocols, provides for concurrent use of the telephone 1101 and the computer 1102 using a single POTS line. A POTS splitter 1104 is provided to effect the separation of voice and data signals at the customer's home or business 1100.

Also depicted in FIG. 35 is the central office 1110 of an ILEC. The ILEC's central office 1110 includes a voice switch 1114 coupled to the main distribution frame (not shown) which manages voice band signals communicated between the customer's telephone 1101 and the MDF. A CLEC provides the requested "digital/data" service via an appropriate ADSL DSLAM 1116, which is also situated at the ILEC's central office 1110. It is noted that the DSLAM 1116 is typically connected to a high-speed digital network connection, such as an ATM (Asynchronous Transfer Mode) network connection. A POTS splitter 1112, as discussed previously, provides for the requisite separation of voice band and data band signals at the central office 1110. From the customer's perspective, voice and data communications are effected seamlessly at the central office 1110.

However, and as can be appreciated from the system depiction of FIG. 8, any change of service or troubleshooting that is needed to support a particular customer's service request requires that the CLEC gain admittance to the ILEC's central office 1110 and to the CLEC's co-location cage. Such service calls to the ILEC's central office 1110 by the CLEC typically requires payment of a fee for admittance to the ILEC's facility. Further, the CLEC pays a lease fee to the ILEC for the physical space required to house the CLEC's co-locations cage. These fees are typically passed on to the customer.

Figure 36:
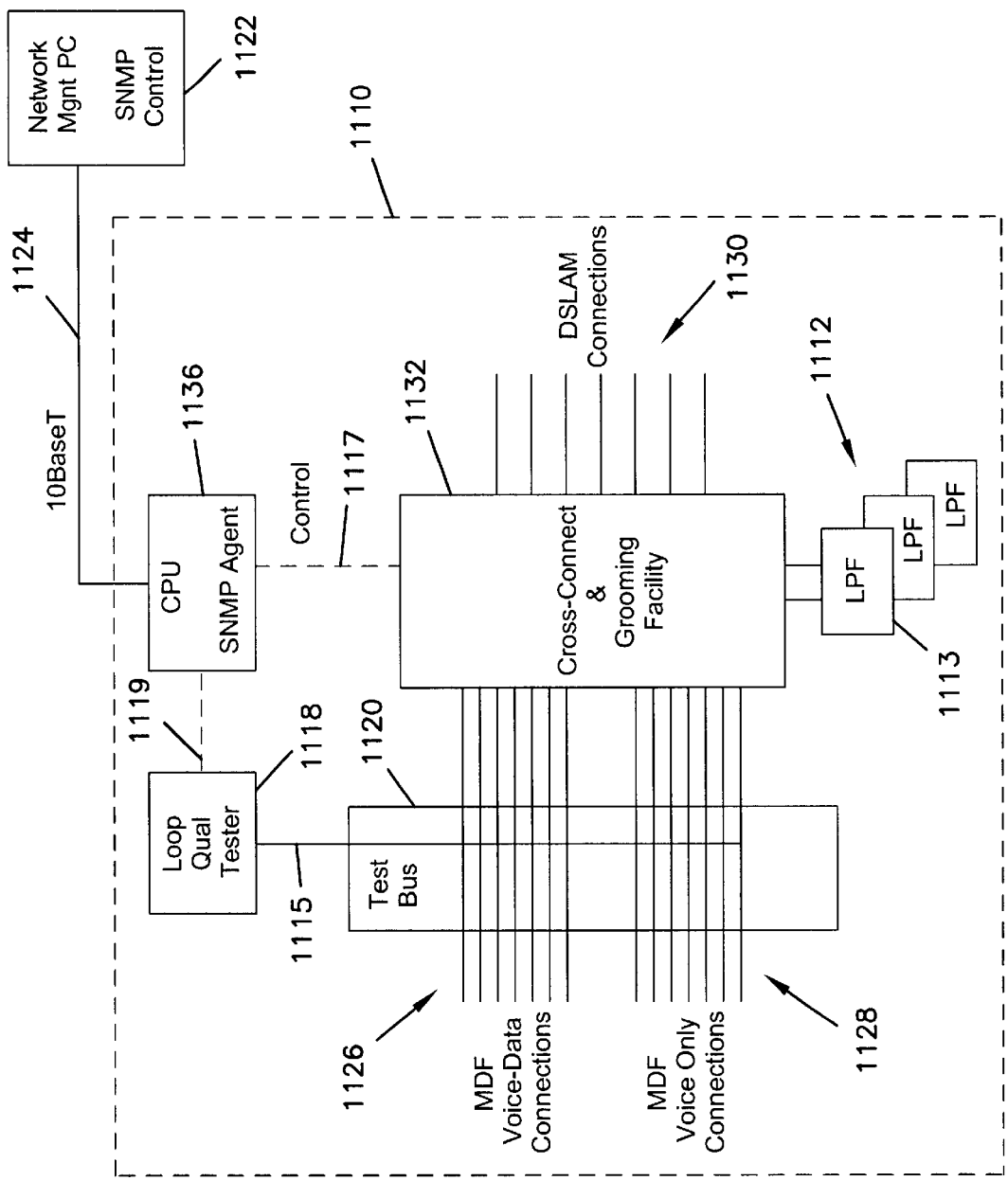
FIG. 36 is a block diagram of a system that provides one or more of a remote test access, cross-connect, grooming, and/or POTS splitting capability.

Employing an electronic cross-connect system and methodology of the present invention eliminates many of the delay, cost, and inconvenience issues associated with more conventional cross-connect management approaches. FIG. 36 depicts a system deployment of an electronic cross-connect system according to the present invention which provides for remotely controlled switching of one or more cross-connect matrices that effect desired cross-connect, grooming, and POTS splitting functions associated with a variety of xDSL (e.g., ADSL) services. According to the embodiment depicted in FIG. 36, an electronic cross-connect and grooming facility 1132 is coupled between a main distribution frame, owned by an ILEC, and a CLEC's DSLAM units. It is understood that the cross-connect system may be physically located within the ILEC's central office space, a CLEC's co-location space (e.g., cage), or both.

As shown, the electronic cross-connect and grooming facility 1132 is coupled to a number of MDF composite voice/data signal (e.g., ADSL) connections 1126, a number of MDF voice only signal connections 1128, and a number of DSLAM connections 1130. It is noted that the electronic cross-connect and grooming facility 1132 may also be coupled to a number of MDF data only connections (not shown). Also shown coupled to the electronic cross-connect and grooming facility 1132 are a number of low-pass filters 1113 of one or more POTS splitter devices 1112 that are selectively connected to particular MDF composite voice/data connections 1126 for purposes of performing POTS splitting functions thereon.

A CPU 1136 is coupled to the electronic cross-connect and grooming facility 1132 via a control line 1117 and coordinates the switching of the one or more cross-connect fields provided in the electronic cross-connect and grooming facility 1132. The CPU 1136 may utilize a network management agent, such as an SNMP (Simple Network Management Protocol) agent, to communicate with a remote host processor 1122 via a network connection, such as a 10BaseT or 100BaseT connection 1124, for example. The host processor 1122 may comprise a network management PC running appropriate network management control software. The remote host processor 1122 cooperates with the local CPU 1136 to remotely effect desired cross-connections between the MDF, DSLAMs, and POTS splitters 1112 (e.g., LPFs 1113).

Figure 37:
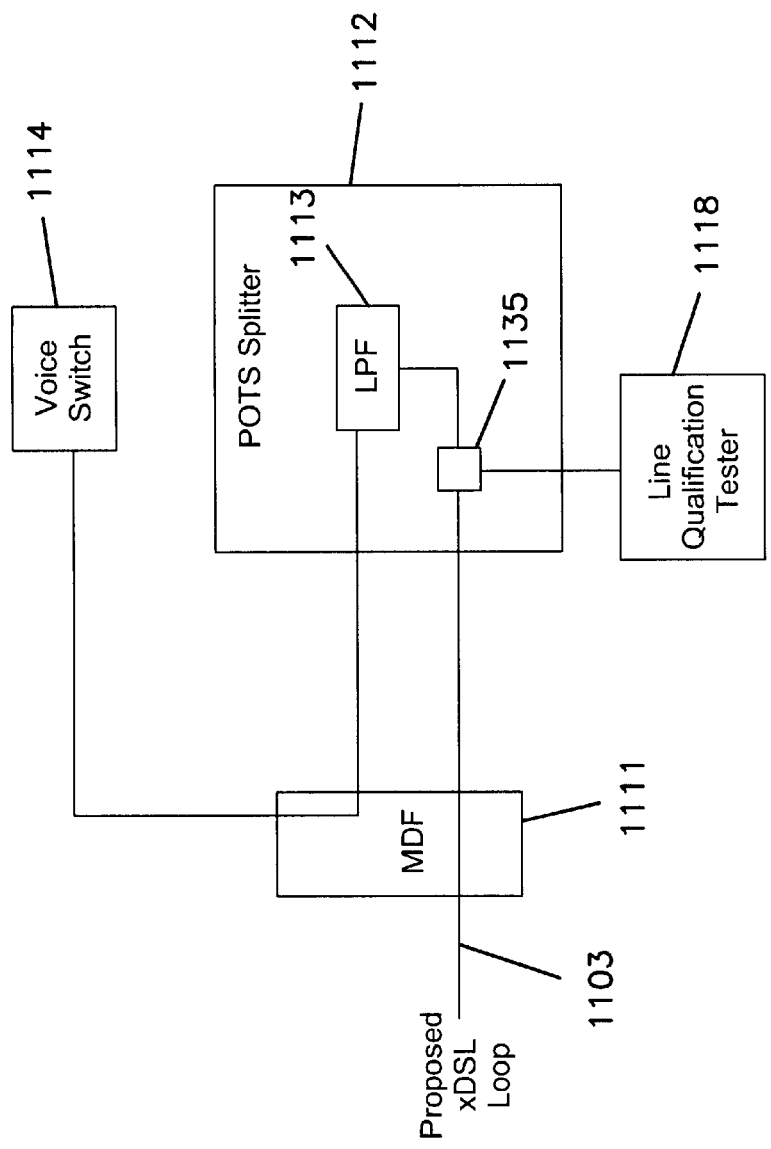
FIG. 37 illustrates an xDSL system implementation which provides for line qualification testing of selected customer lines.

A line tester, such as a loop qualification tester 1118, may further be coupled to the CPU 1136 via a control line 1119. CPU 1136 may control the operation of the tester 1118 in response to control signals received from the remote host processor 1122. The line tester 1118 may employ a test bus 1120 to establish connectivity between the line tester 1118 and a particular customer's line. In the ADSL deployment depicted in FIG. 37, for example, a break 1135 in the customer's line is established by the electronic cross-connect and grooming facility 1132 or by the test bus apparatus 1120 to temporarily isolate the customer's loop for purposes of conducting line testing thereon. Isolating the customer's line is required so that impedances associated with the low-pass filter 1113 of the POTS splitter 1112 and other downstream components do not interfere with the proper evaluation of the customer's connection.

Figure 38:
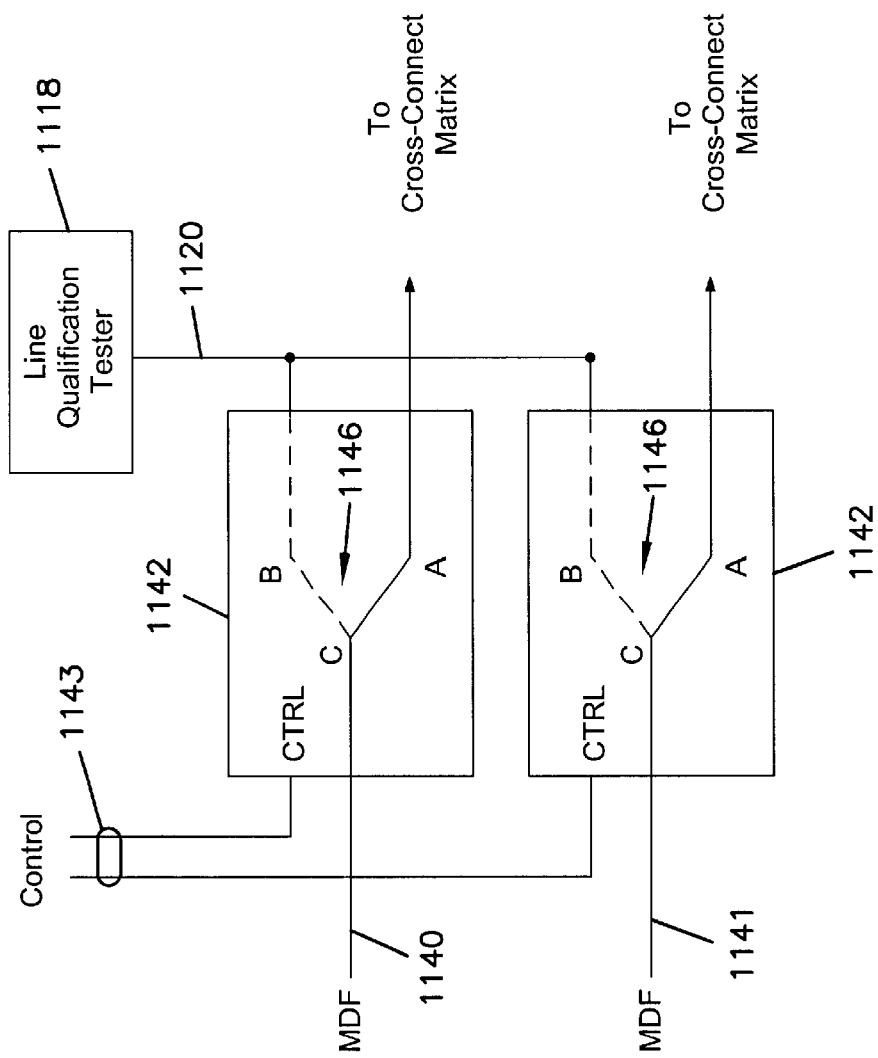
FIG. 38 illustrates a circuit implementation for remotely testing a selected customer line in accordance with an embodiment of the present invention.

One embodiment of an electronically controlled test bus 1120 is depicted in FIG. 38. According to this embodiment, and with continued reference to FIG. 36, the test bus 1120 may include a matrix of switches 1142 each provided with a control input, CTRL, for receiving control signals produced by CPU 1136 via control lines 1143. In response to a control signal, a selected switch 1142 activates a relay 1146, such as an A-B relay, to connect a particular MDF line 1140 or 1141 from the cross-connect matrix to the line tester 1118. The line tester 1118 then performs one or more tests on the isolated customer's line under the cooperative direction of CPU 1136 and the remote host processor 1122 via control line 1119 and network line 1124, respectively. Upon completion of the line testing procedure, an appropriate control signal produced by the CPU 1136 causes the selected switch 1142 to reconnect the particular MDF line 1140 or 1141 to the cross-connect matrix and to an appropriate DSLAM.

As was discussed previously connections between the line tester 1118 and selected MDF/customer lines may be established directly by the cross-connect field of the electronic cross-connect and grooming facility 1132, rather than by a separate test bus 1120. The testing and cross-connect approaches and apparatuses disclosed in commonly owned U.S. Ser. No. 09/461,529, now abandoned filed concurrently herewith under 100.414US01 Ser. Nos. 09/219,269 and 09/219,810 filed concurrently on Dec. 23, 1998; Ser. No. 09/327,060 filed Jun. 7, 1999; and Ser. No. 08/972,159 filed Nov. 17, 1997, all of which are hereby incorporated herein by reference in their respective entireties, may be advantageously adapted or modified to implement electronic cross-connect, grooming, and POTS splitting functionality in accordance with the principles of the present invention.

It is to be understood, that even though numerous characteristics and advantages of the invention have been set forth in the foregoing description, together with details of the structure and function of the invention, the disclosure is illustrative only, and changes may be made in detail, especially in matters as such shape, size, and arrangement of the parts within the principles of the invention to the full extent indicated by the broad general meaning of the terms which the appended claims are expressed.

What is claimed is:

1. A telecommunications equipment for use with twisted pair cable comprising:

a chassis including a grooming panel having a first array of connectors, and a second array of connectors, each of the connectors of the first and second arrays of connectors including a plurality of pairs of conductors;

the grooming panel including a first side and a second side, the first side of the grooming panel defining connector locations for mounting with twisted pair cable connectors, the second side of the grooming panel defining a grooming area;

a plurality of conductors positioned in the grooming area linking each conductor of selected pairs of conductors from the connectors of the first array of connectors to a respective conductor of selected pairs of conductors from the connectors of the second array of connectors, wherein conductor pairs from a plurality of selected connectors in the first array are linked to respective conductor pairs of a selected connector of the second array.

2. The equipment of claim 1, further comprising a POTS splitter device connected to selected connectors of the first array on the first side and selected connectors of the second array on the first side.

3. The equipment of claim 1, further comprising a POTS splitter device internal to the chassis and connected to a first set of selected connectors of the first array on the second side, the POTS splitter device further connected to selected connectors of the second array on the second side, the POTS splitter device further connected to a second set of selected connectors of the first array on the second side.

4. The equipment of claim 3, wherein the POTS splitter device includes a plurality of low pass filters, and further comprising two backplanes, each extending in different planes parallel to one another, each backplane including a plurality of circuit paths connecting each of the first set of selected connectors of the first array to one of the low pass filters of the POTS splitter device, the circuit paths further connecting one output of each of the low pass filters of the POTS splitter device to each of a respective one of the selected connectors of the second array, and a second output of each of the low pass filters of the POTS splitter device to each of a respective one of the second set of connectors of the first array.

5. A telecommunications equipment for use with twisted pair cable comprising:

a chassis including a grooming panel with a first plurality of connectors, each connector of the first plurality having a plurality of pairs of conductors, the grooming panel having a first side and a second side, the first side of the grooming panel defining connector locations for mounting with twisted pair connectors, the second side of the grooming panel defining connector locations for connecting to conductors;

a cross-connect panel with a second plurality of connectors, each connector of the second plurality of connectors having a first end and a second end, the first ends exposed on a first side of the cross-connect panel, the second ends exposed on a second side of the cross-connect panel, a pair of second ends being provided for each pair of conductors of selected connectors on the grooming panel;

a plurality of conductors linking the second ends of the second plurality of connectors to the conductors of the pairs of conductors of the selected connectors of the first plurality of connectors in a one-to-one correspondence, wherein the first side of the cross-connect panel defines a cross-connect field.

6. The equipment of claim 5, further comprising a POTS splitter device connected to the first side of the grooming panel.

7. The equipment of claim 5, further comprising a POTS splitter device connected to the second side of the grooming panel, and connected to the second side of the cross-connect panel.

8. The equipment of claim 6, further comprising an MDF and a DSLAM device connected to the first side of the grooming panel.

9. The equipment of claim 7, further comprising an MDF and a DSLAM device connected to the first side of the grooming panel.

* * * * *